United States Patent
Hameleers et al.

(10) Patent No.: US 7,352,743 B2
(45) Date of Patent: Apr. 1, 2008

(54) TRAFFIC MANAGEMENT SYSTEM INCLUDING PACKET TO OBJECT SYNCHRONIZATION MECHANISMS

(75) Inventors: Heino Hameleers, Kerkrade (NL); Frank Hundscheidt, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 953 days.

(21) Appl. No.: 10/644,467

(22) Filed: Aug. 20, 2003

(65) Prior Publication Data
US 2004/0047325 A1    Mar. 11, 2004

(30) Foreign Application Priority Data
Aug. 20, 2002  (EP) .................................. 02018202

(51) Int. Cl.
*H04L 12/28* (2006.01)

(52) U.S. Cl. .................... 370/389; 370/328; 370/352; 701/117

(58) Field of Classification Search ............... 370/389, 370/338, 328, 352, 356; 701/117, 118
See application file for complete search history.

(56) References Cited

U.S. PATENT DOCUMENTS

| | | | | |
|---|---|---|---|---|
| 5,289,183 A | * | 2/1994 | Hassett et al. | 340/905 |
| 5,793,762 A | * | 8/1998 | Penners et al. | 370/389 |
| 5,797,113 A | * | 8/1998 | Kambe et al. | 701/201 |
| 6,418,139 B1 | * | 7/2002 | Akhtar | 370/356 |
| 6,529,499 B1 | * | 3/2003 | Doshi et al. | 370/352 |
| 6,680,922 B1 | * | 1/2004 | Jorgensen | 370/328 |
| 6,694,247 B2 | * | 2/2004 | Hameleers et al. | 701/117 |
| 6,795,823 B1 | * | 9/2004 | Aklepi et al. | 707/10 |
| 6,920,134 B2 | * | 7/2005 | Hameleers et al. | 370/389 |
| 2002/0065599 A1 | * | 5/2002 | Hameleers et al. | 701/117 |
| 2004/0202154 A1 | * | 10/2004 | Aklepi et al. | 370/352 |

\* cited by examiner

*Primary Examiner*—Hassan Kizou
*Assistant Examiner*—Mounir Moutaouakil

(57) ABSTRACT

A traffic management system and a method for managing in a network object traffic formed on a physical layer along path sections between individual path points. The traffic management system comprises a packet switched control network including said packet control units on a traffic control layer in which packets moving along packet routing links between packet control units simulate the movement of corresponding objects in the physical layer. If the arrival of an object is detected at a path point and the arrival of a corresponding packet is not detected at a packet control unit corresponding to the path point, a synchronization device in a packet control unit sends a packet corresponding to the object to the packet control unit corresponding to the path point at which the object has arrived. Thus, avoiding non-synchronous states between the packet routing and object movement.

16 Claims, 10 Drawing Sheets

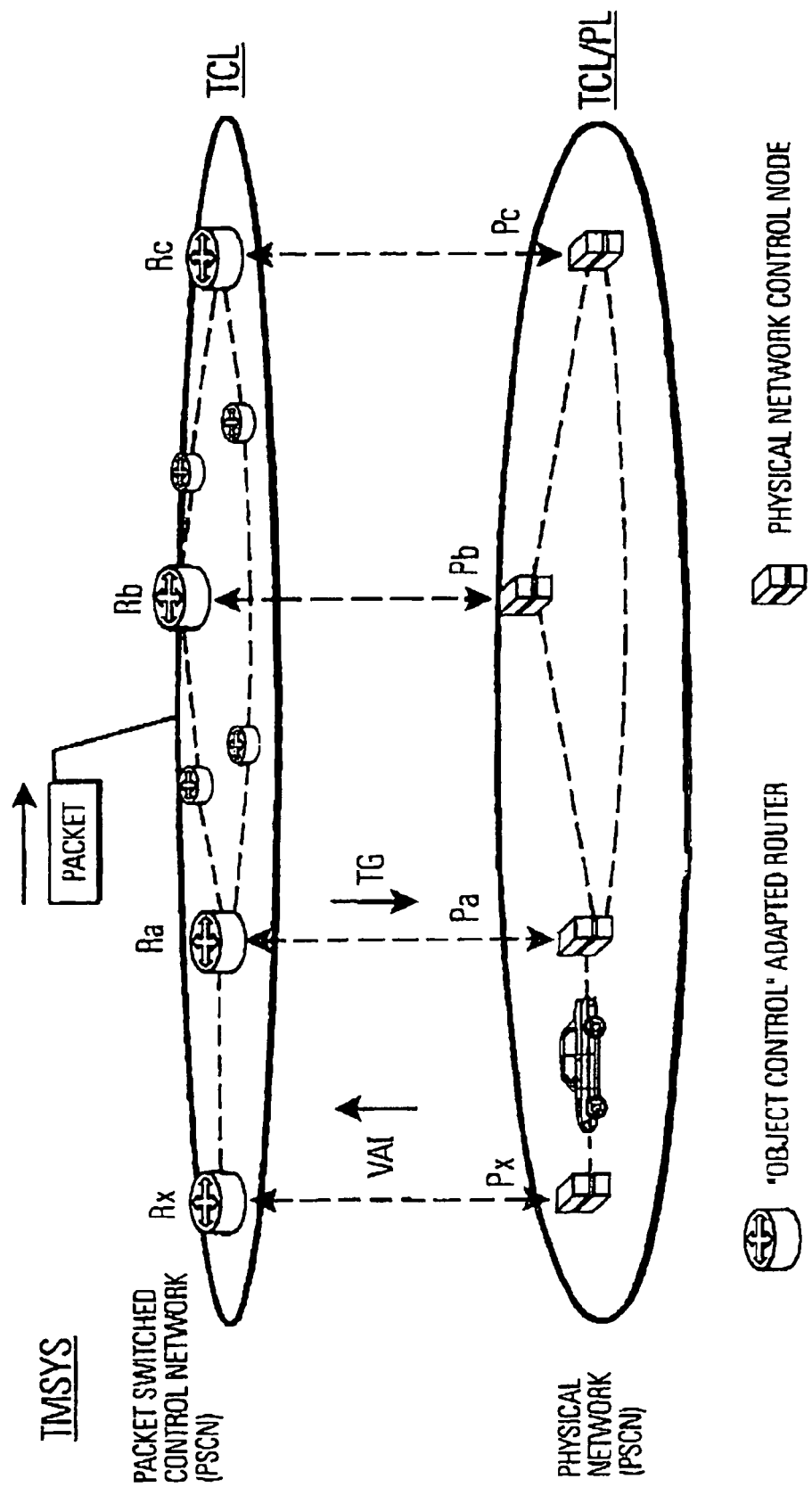

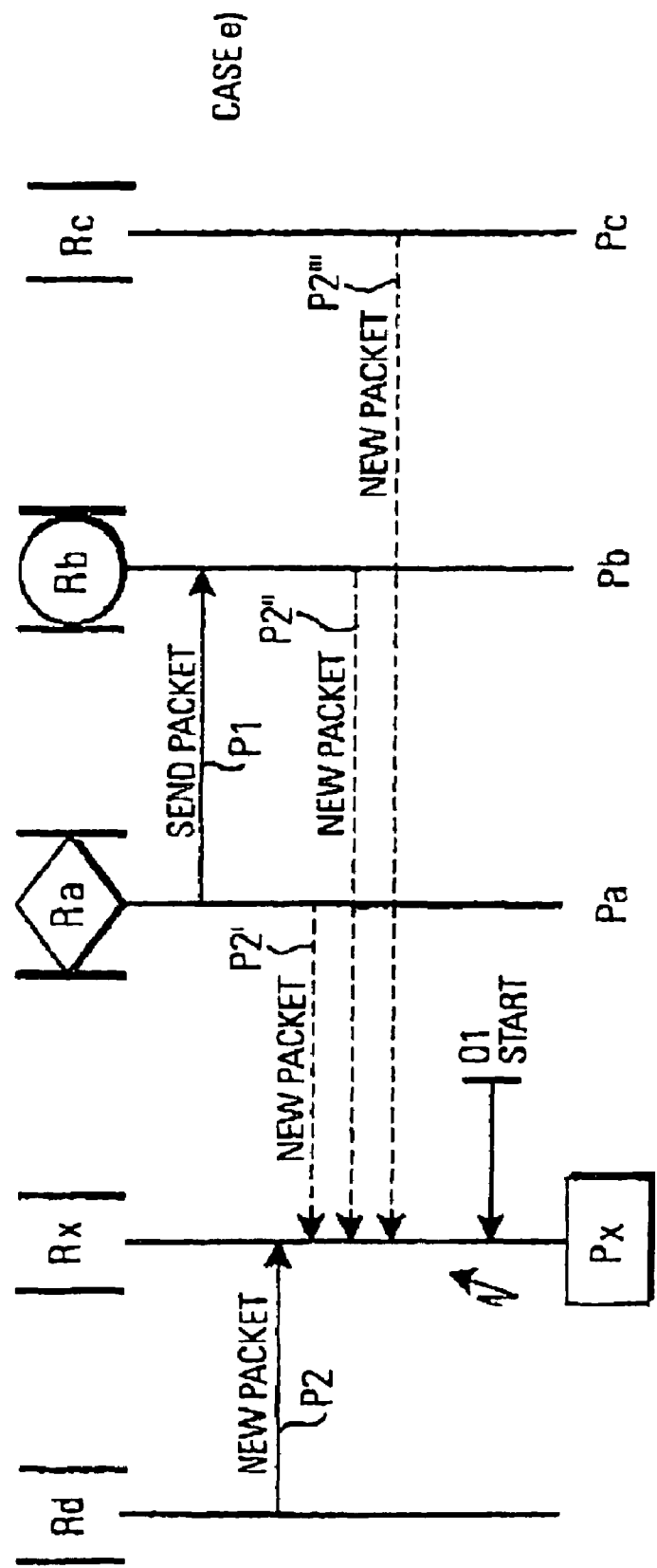

TRAFFIC MANAGEMENT SYSTEM INCLUDING PACKET TO OBJECT SYNCHRONIZATION MECHANISMS

FIELD OF THE INVENTION

The present invention relates to a traffic management system for managing in a network an object traffic on a physical layer by using a packet switched control network on a traffic control layer. In the packet switched control network packets are routed along packet routing links between packet control units such that the packet routing on the traffic control layer corresponds to the object movement on the physical layer. Thus, in such a traffic management system each packet routing along a packet routing link should correspond to an object movement on a corresponding path section of the network such that each packet routing simulates the movement of a respective object.

Furthermore, the present invention relates to a packet control unit for being included in such a packet switched control network and a method for managing in a network the object traffic on a physical layer.

BACKGROUND OF THE INVENTION

Normally, in a passive monitoring state of the packet switched control network, traffic information units on a traffic signalling layer can be used to merely monitor the presence and the movement of objects in the network of the physical layer and the packet routing in the packet switched network will correspond to the object movement in the physical layer.

Alternatively, the traffic signalling layer may also comprise traffic information units which can perform a guiding function for the objects on the physical layer. In this case, the packet switched control network can actively control the object traffic on the physical layer by beforehand simulating a packet routing in the packet switched network and by outputting corresponding control information to the traffic information units which will then output corresponding traffic guidance information to the objects on the physical layer.

Such traffic management systems are described in the European patent applications No. 00 125 249.3 and EP No. 00 125 248.5 by the same applicant.

In both aforementioned operation modes, i.e. the passive mode (monitoring) and the active mode (controlling of objects), the packet routing on the traffic control layer may not correspond to the object movement on the physical layer due to various circumstances.

Firstly, of course the packet routing in a packet switched control network between two packet control units is usually much faster than the actual object movement or on the network of the physical layer. Thus, the object may arrive later at a path point, which corresponds to the packet control unit to which the corresponding packet is routed. The same problem may occur if the packet is first stored in the transmitting packet control unit, the object movement takes place and the packet is only transmitted to the target packet control unit after the object arrives at a corresponding path point.

Secondly, even if in the passive mode (monitoring) object movements correspond to packet routings, an object on a physical layer may suddenly stop between two path Points or a new object may suddenly start moving between two path points. Also in such a situation the packet routing may not be corresponding to the object movement.

Thirdly, in the active mode (object control), traffic guidance information can be provided to the objects at path points or even along the path sections to indicate to the objects essentially the succeeding path point to which the object should move in the network. However, the object may decide for various reasons not to follow the indication by the traffic guidance information and may actually move to a succeeding path point such that the path point to which the object has moved will not correspond to the target packet control unit to which the corresponding packet has been routed from the source packet control unit.

In each of the aforementioned cases the packet routing in the packet switched control network is out of synchronization to the object movement on the physical layer. This situation is herein after called the "out of sync" state. Such out of sync states in the traffic management system should be avoided because the packet routing in the packet switched control network will not be a correct reflection of the object movement and thus no accurate monitoring and/or control of the objects can take place.

SUMMARY OF THE INVENTION

As explained above, in a traffic management system, which comprises a packet switched control network in which packets are routed along packet routing links between packet control units such that the packet routing will simulate or correspond to the object movement of objects on a physical layer, synchronization problems can occur such that the packet routing of packets in the packet switched control network will not be an accurate reflection of the object movement in the physical layer.

The present invention aims at avoiding the aforementioned problems. In particular, the object of the present invention is to provide a packet control unit for being included in a packet switched control network, a traffic management system and a method for managing the object traffic in a network, which allow a re-synchronization when out of synchronization states occur between the packet routing and the object movement.

This object is solved by a packet control unit for being included in a packet switched control network as one of a plurality of packet control units for controlling a packet traffic constituted by a plurality of packets being routed between said packet control units along a plurality of packet routing links, said packet switched control network being configured in such a way that said packet routing links and said packet control units respectively correspond to path sections and path points of an object movement network in which an object traffic is formed by a plurality of objects moving along said path sections between said path points, and each path point (ICP1-ICPn) of said object movement network having associated with it a traffic information unit adapted at least to detect the arrival of objects at the path point and to output a corresponding object arrival information, including a transmission device adapted to send respective packets onto a packet routing link to a succeeding target packet control unit on the basis of a respective routing decision in accordance with a predetermined packet routing method used in said packet switched control network for the controlling of said packet traffic; a reception device (REC) adapted to receive packets from other packet control units (PCU1-PCUn) of said packet switched control network (PSCN) and at least one object arrival information (VAI1-VAIy) indicating the arrival of an object (CR1-CRx) at one of said path points (Px; ICP1-ICPn); and a synchronisation device (SYNC) adapted to cause the sending of a packet corresponding to said object to the packet control unit (Rx) corresponding to said path point (Px) at which the object arrival was detected by its associated traffic information unit.

This object is also solved by a packet control unit for being included in a packet switched control network as one of a plurality of packet control units for controlling a packet traffic constituted by a plurality of packets being routed between said packet control units along a plurality of packet routing links, said packet switched control network being configured in such a way that said packet routing links and said packet control units respectively correspond to path sections and path points of an object movement network in which an object traffic is formed by a plurality of objects moving along said path sections between said path points, and each path point (ICP1-ICPn) of said object movement network having associated with it a traffic information unit adapted at least to detect the arrival of objects at the path point and to output a corresponding object arrival information, including a transmission device adapted to send respective packets onto a packet routing link to a succeeding target packet control unit on the basis of a respective routing decision in accordance with a predetermined packet routing method used in said packet switched control network for the controlling of said packet traffic; a reception device adapted to receive packets from other packet control units of said packet switched control network and an object arrival information indicating the arrival of an object at the path point corresponding to said packet control unit; and a synchronisation device adapted to cause the sending of a packet corresponding to said object to the packet control unit if a received object arrival information indicates the arrival of an object at the path point corresponding to said packet control unit, said reception device being also adapted to receive said sent packet corresponding to said object.

This object is also solved by a packet control unit for being included in a packet switched control network as one of a plurality of packet control units for controlling a packet traffic constituted by a plurality of packets being routed between said packet control units along a plurality of packet routing links, said packet switched control network being configured in such a way that said packet routing links and said packet control units respectively correspond to path sections and path points (ICP1-ICPn) of an object movement network in which an object traffic is formed by a plurality of objects moving along said path sections between said path points, and each path point of said object movement network having associated with it a traffic information unit adapted at least to detect the arrival of objects at the path point and to output a corresponding object arrival information, including a transmission device adapted to send respective packets onto a packet routing link to a succeeding target packet control unit on the basis of a respective routing decision in accordance with a predetermined packet routing method used in said packet switched control network for the controlling of said packet traffic; a reception device adapted to receive packets from other packet control units of said packet switched control network and object arrival information indicating the arrival of objects at one or more path points; and a synchronisation device adapted to delete a packet in said packet control unit if an object arrival information indicating the arrival of an object corresponding to said packet at a path point is not received within a predetermined time interval by said reception device.

This object is also solved by a traffic management system for managing in a network the object traffic formed, on a physical layer, by a plurality of objects moving along a plurality of path sections of the network and a plurality of path points located at said path sections of the network, and each path point having associated with it a traffic information unit adapted at least to detect the arrival of objects at the respective path point and to output a corresponding object arrival information, comprising: a packet switched control network on a traffic control layer in which the packet traffic constituted by a plurality of packets being routed along a plurality of packet routing links is controlled by a plurality of packet control units located at said packet routing links for controlling the packet traffic in said packet switched control network such that each packet routed along a respective packet routing link corresponds to one object moving on a corresponding path section: each packet control unit being and being adapted to send, with the respective transmission device, as a source packet control unit respective packets onto a packet routing link to a succeeding target packet control unit on the basis of a respective routing decision in accordance with a predetermined packet routing method used in said packet switched control network for the controlling of said packet traffic; wherein said packet switched control network on the traffic control layer is configured in such a way that packet routing links correspond to path sections; and packet control units correspond to path points; wherein when a traffic information unit detects the arrival of an object at its associated path point and outputs a corresponding object arrival information, and an arrival packet control unit corresponding to said path point does not detect the arrival of a packet corresponding to said object, a synchronization packet control unit is adapted to send a packet corresponding to said object to said arrival packet control unit to synchronize the packet routing and the object movement.

This object is also solved by a traffic management system for managing in a network the object traffic formed, on a physical layer, by a plurality of objects moving along a plurality of path sections of the network and a plurality of path points located at said path sections of the network, and each path point having associated with it a traffic information unit adapted at least to detect the arrival of objects at the respective path point and to output a corresponding object arrival information, comprising: a packet switched control network on a traffic control layer in which the packet traffic constituted by a plurality of packets being routed along a plurality of packet routing links is controlled by a plurality of packet control units located at said packet routing links for controlling the packet traffic in said packet switched control network such that each packet routed along a respective packet routing link corresponds to one object moving on a corresponding path section; each packet control unit being adapted to send, with the respective transmission device, as a source packet control unit respective packets onto a packet routing link to a succeeding target packet control unit on the basis of a respective routing decision in accordance with a predetermined packet routing method used in said packet switched control network for the controlling of said packet traffic; wherein said packet switched control network on the traffic control layer is configured in such a way that packet routing links correspond to path sections; and packet control units correspond to path points; wherein when a traffic information unit detects the arrival of an object at its associated path point and outputs a corresponding object arrival information, and an arrival packet control unit corresponding to said path point does not detect the arrival of a packet corresponding to said object, a synchronization packet control unit is adapted to send a packet corresponding to said object to said arrival packet control unit to synchronize the packet routing and the object movement.

Essentially, in each of the above mentioned packet control units, a synchronisation device is used in order cause a sending of a packet to another packet control unit whose corresponding path point has detected the arrival of an object or to delete a packet.

Also, in the traffic management system and in the method, traffic information units detect the arrival of an object at their associated path points and output the corresponding object arrival information. If the packet control unit which corresponds to a path point which detects to the arrival of an object does not detect the arrival of a packet corresponding to the object, the packet switched control network instructs a synchronization device in a packet control unit to send a packet corresponding to the object to the arrival packet control unit which corresponds to the path point whose traffic information unit has output the object arrival information.

Thus, if there is a mismatch between the packet routing and the object movement, a re-synchronization is achieved by a synchronisation device of a packet control unit corresponding to the path point at which the object has arrived.

ADVANTAGEOUS EMBODIMENTS

Preferably, said synchronisation device is adapted to cause said transmission device to send to said packet control unit corresponding to said path point at which the object arrival was detected a packet stored at said packet control unit and to be transmitted to said target packet control unit.

Preferably, said synchronisation device is adapted to cause a transmission device of another packet control unit corresponding to a path point from which said object has moved to the path point for which the object arrival has been detected, to send to said packet control unit corresponding to said path point at which the object arrival was detected a packet stored at said another packet control unit and to be transmitted to said packet control unit.

Preferably, said synchronisation device is adapted to cause said transmission device to send to said packet control unit corresponding to said path point at which the object arrival was detected a copy of a packet stored at said packet control unit and sent to said target packet control unit.

Preferably, said synchronisation device is adapted to store a packet link information indicating the target packet control unit to which the packet has been sent by said transmission device wherein said synchronisation device is adapted to cause the target packet control unit identified by the stored packet link information to send the packet to the packet control unit corresponding to said path point at which the object arrival was detected.

Preferably, said synchronisation device, upon receipt of said object arrival information, is adapted to broadcast to all its adjacent packet control units a packet search request to cause said target packet control unit to send a packet to the packet control unit corresponding to said path point at which the object arrival was detected.

Preferably, when said transmission device of said packet control unit plans to sent a packet to its succeeding target packet control unit and no object arrival information for an object corresponding to this packet is generated from the traffic information unit at the path point corresponding to the target packet control unit or any other packet control unit within said predetermined time interval, said synchronisation device is adapted cause a deletion device to cancel said packet before said transmission device sends it to said target packet control unit.

Preferably, said synchronisation device is adapted to cause a generation device to generate a new packet and to cause said transmission device to send to said packet control unit corresponding to said path point at which the object arrival was detected said newly generated packet.

Preferably, said traffic information units are also adapted to guide an object onto a path section to a succeeding path point corresponding to a target packet control unit determined by the source packet control unit in accordance with said routing decision.

Preferably, said packet search request is constituted by a search packet sent to said adjacent packet control units.

Preferably, said search packet comprises a life time field indicating the life time of said search packet wherein said adjacent packet control units comprise a deletion device adapted to delete said search packet if the life time field indicates a life time exceeding a maximum allowable life time.

Hereinafter, the invention will be described with reference to its advantageous embodiments. However, it should be noted that the invention also comprises embodiments, which result from a combination of features, which have been separately described in the claims, the description and the drawings.

BRIEF DESCRIPTION OF THE DRAWINGS

FIG. 3 shows an example of a number of interconnected packet control units $R_x$, $R_a$, $R_b$, $R_c$ of the packet switched control network and a number of corresponding path points $P_x$, $P_a$, $P_b$, $P_c$ in the traffic management system TMYS shown in FIG. 1 and FIG. 2;

FIG. 10 shows a fifth embodiment of the traffic management system TMSYS, in accordance with the invention, in particular showing the case where an out of synchronization state is present due to the occurrence of the new object in the physical layer.

It should be noted that in the drawings the same similar reference numerals and designation of steps and symbols denote the same or similar parts and steps throughout.

Furthermore, it should be noted that the packet switched control network of the invention, as described below, could be implemented by any type of packet-switching network and not only for example using the Internet Protocol. Therefore, if in the description specific reference is made to protocols and expressions used in a specific packet switching environment it should be understood that this should by no means be regarded as limiting for the invention. Therefore, the skilled person may find corresponding messages and features in other packet switching environments, which are not specifically listed here.

Hereinafter, the traffic management system will be described with an example in which the objects are vehicles and the network is a road network on a physical layer. However, the invention is not limited to vehicles moving in a road network but the objects may be any type of object moving in any type of network on a physical layer. Such other types of objects may be manufactured products moving around in a manufacturing hall on e.g. conveyer belts, products distributed through a distribution network between retailers, parcels being delivered in a parcel delivery system, objects moved around in a client/server system or any other type object which is moved around in a network comprising path points interconnected through some path sections.

From these examples it should also be understood that the path sections may not necessarily be physical roads or links but may just be an indication that an object is to be moved from one path point to a next or succeeding path point.

Furthermore, the vehicles can comprise cars, motorcycles, tracks, bicycles or even pedestrians etc. driving or moving on a road network consisting of road sections formed by roads, streets, motorways etc. However, the vehicles also comprise vehicles which are rail-bound i.e. trains, trams etc. driving on a railroad network formed of railroad sections. Also combinations are possible where the vehicles comprise both road-bound vehicles and rail-bound vehicles and where the road network comprises railroad sections as well as standard road sections. Thus, the term "road section" can mean any portion of a network on which a vehicle can move depending on its driving mechanism. In principle, the vehicles may also be extended to vessels and aircrafts where the "road sections" correspond to a predetermined travel route on sea or in the air between a source (origin) and a target (destination). Thus, the invention contemplates various types of objects moving or travelling along movement sections of any type of network such that the invention is not limited to the specific examples of objects, path sections, path points, networks and traffic signalling units as explained below.

Overview of the Traffic Management System

Figure 1:
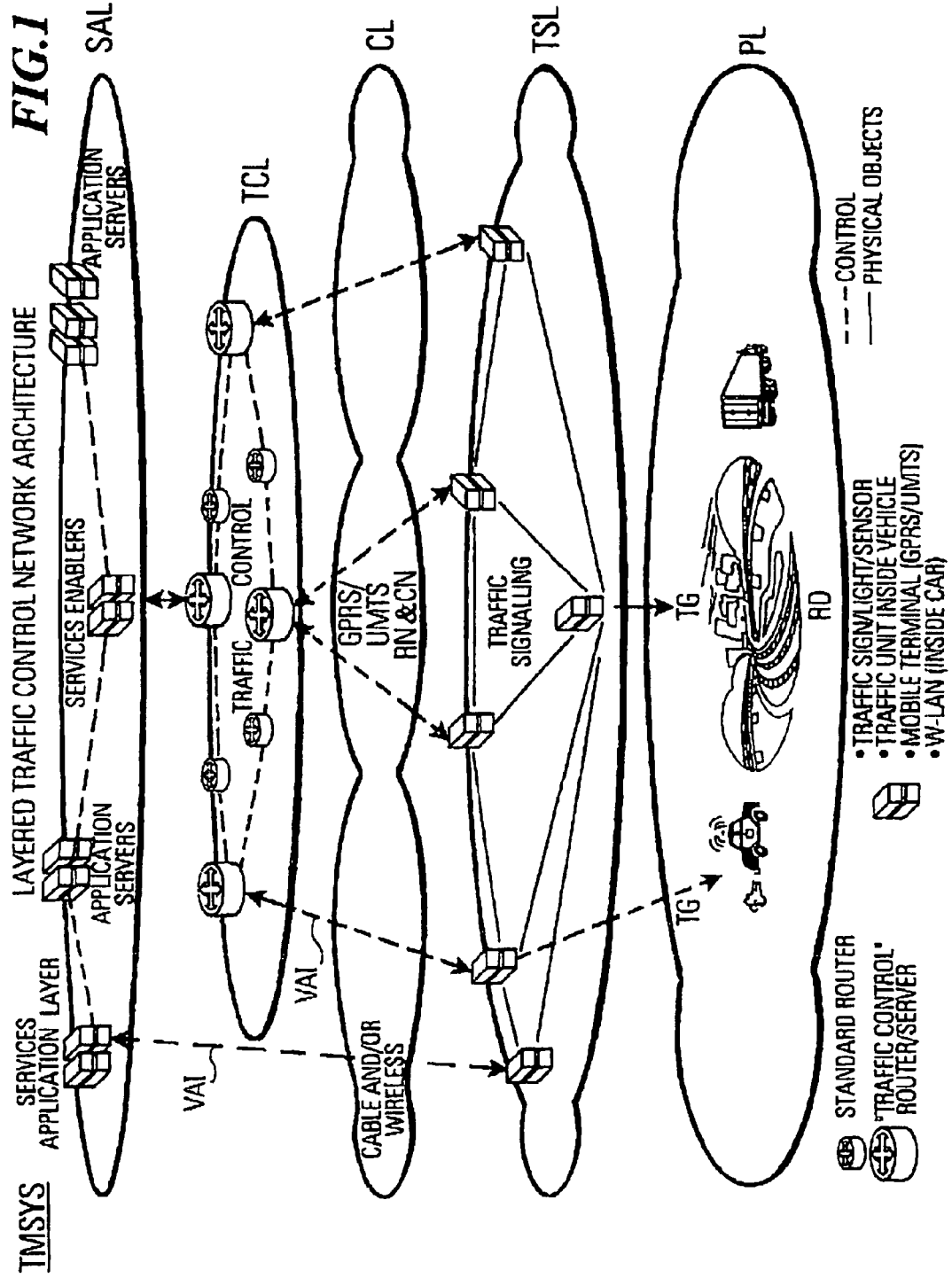
FIG. 1 shows an overview of a traffic management system TMSYS to which the invention pertains.
Figure 2:
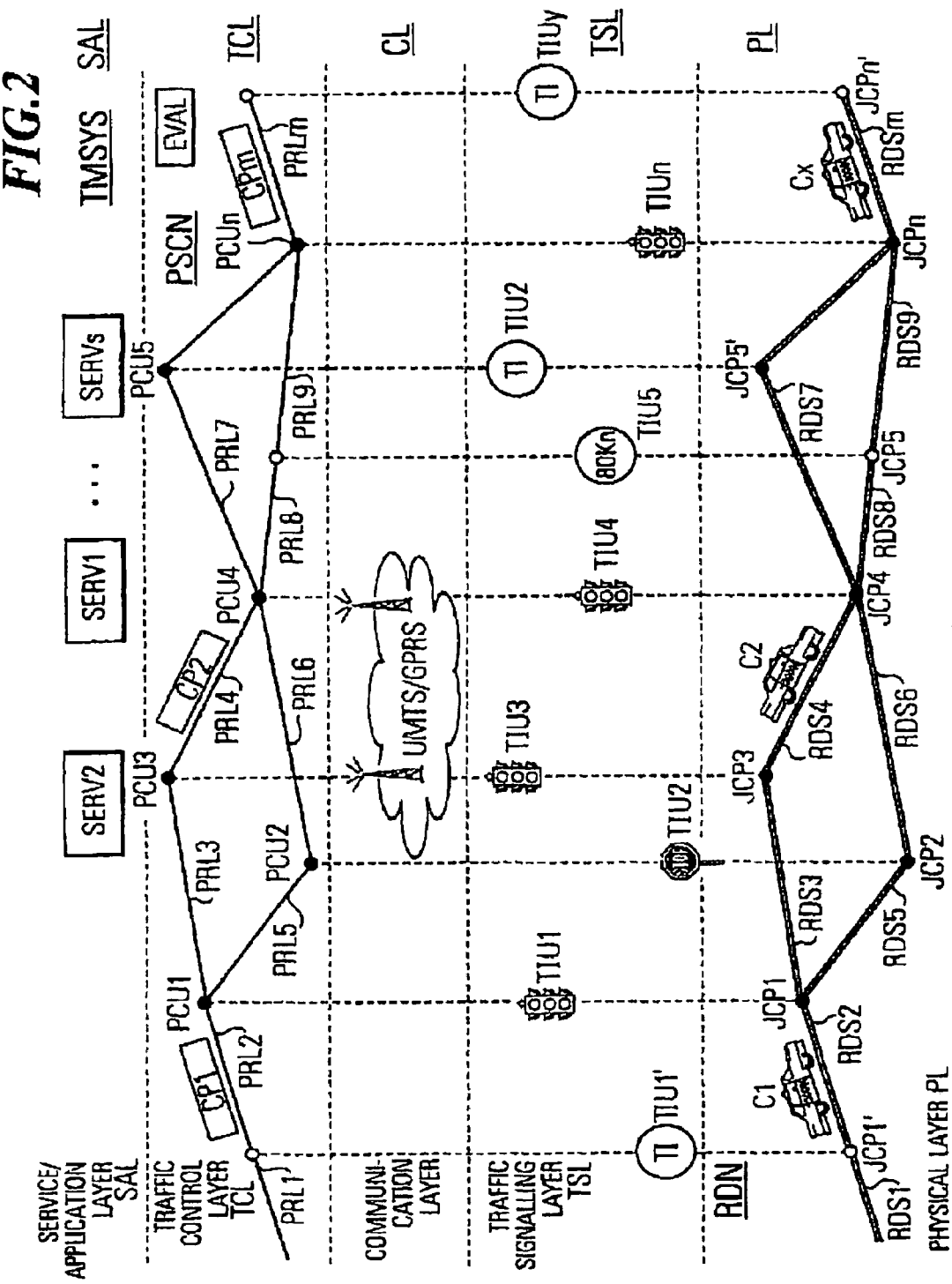
FIG. 2 shows a more detailed diagram of individual devices used in the traffic management system of FIG. 1, showing in particular also packet control units in the packet switched control unit (PSCN) on the traffic control layer (TCL)

Hereinafter, an overview of the traffic management system TMSYS to which the invention pertains will be described with reference to FIG. 1 and FIG. 2. With reference to FIG. 1 and FIG. 2 only those features will be described which are relevant for the present invention whilst more information about the traffic management system TMSYS can be gained from the aforementioned European patent applications EP No. 00 125 249.3 and EP No. 00 125 248.5 by the same applicant which are herewith incorporated in the present application via reference in their entirety.

In FIG. 1 the traffic management system SYS comprises a service application layer SAL, a traffic control layer TCL, a communication layer CL, a traffic signalling layer TSL, and a physical layer PL.

The object traffic takes place on the physical layer PL and FIG. 1 shows as an example of an object the vehicle Cm moving on a road network RD. The traffic signalling layer TSL comprises traffic information units TIU1-TIUn, TIUy for providing traffic guidance information TG (see also FIG. 3) to the vehicles C and for collecting traffic information e.g. VAI (Vehicle Arrival Information) about the vehicle traffic in the physical layer PL and for forwarding such vehicle or object arrival information VAI (see also FIG. 3) to the traffic control layer TCL and/or the service application layer SAL.

The traffic control layer TCL comprises a packet switched control network PSCN in which the packet traffic takes place and the packet switched control network PSCN includes one or more packet control units PCU1-PCUn, in accordance with one aspect of the invention, being interconnected amongst each other via respective packet routing links PRL1-PRLm.

The service application layer SAL comprises a number of servers such as application servers and services enablers. The servers of the service application layer SAL communicates with the packet control units of the traffic control layer and/or the traffic information units of the traffic signalling layer TSL.

The communicating layer CL provides communication facilities for the communication between the service application layer SAL and the traffic-signalling layer TSL and/or between the traffic control layer TCL and the traffic signalling layer TSL. The communication layer CL can comprise a cable and/or a wireless network, for example a GPRS/UMTS network.

In such a traffic management system SMYS as shown in FIG. 1 vehicles on the physical layer PL (i.e. the lowest layer consisting of roads and vehicles) are accompanied and controlled by packets in the packet switched control network PSCN of the traffic control layer TCL. The complete operation of the system and the exchange of information is well described in the two aforementioned European patent applications by the same applicant.

In one aspect of the invention, the traffic signalling layer TSL collects and forwards object (vehicle) arrival information VAI to the service application layer SAL and/or the traffic control layer TCL. This information is needed in particular in the packet control units to allow their synchronisation devices to perform a re-synchronization of the traffic management system TMSYS. For the present invention, it is not important whether the traffic management system TMSYS entirely operates in the passive mode (monitoring) or in the active mode (guiding the vehicles C). In both cases the re-synchronisation can take place, in accordance with the invention as described below.

In FIG. 1 the object traffic takes place on the network RD on the physical layer PL. The traffic control layer TCL, more precisely its packet switched control network PSCN, can be constituted by the Internet. As will be understood below, in some embodiments of the invention it may be necessary to monitor the packet routing in the packet switched control network. The operation of the Internet can be monitored closely by the routers serving as the packet control units.

When something unexpected occurs, the event can be reported by the so-called Internet Control Message Protocol (ICMP), which is also used to test the Internet. Many different types of ICMP messages are defined in this protocol such as "Destination unreachable" (packet could not be delivered to a target packet control unit) or "Parameter problem" (invalid header field). Such features of the Internet can be used in order to detect out of synchronization states in which the packet traffic does not correspond to the object or vehicle traffic anymore.

For example, if an ICMP message of "Destination unreachable" is output, this could mean that the packet could not reach the target packet control unit and that because of this an out of synchronisation state occurs. Special cases of the out of synchronization state will herein after explained with reference to FIG. 4a and FIG. 4b.

FIG. 2 shows more details of the traffic management system TMSYS shown in FIG. 1. The traffic management system TMSYS is for managing in a network RDN the object traffic formed on a physical layer PL. The object traffic is formed by a plurality of objects C1, Cx, such as vehicles, moving along a plurality of path sections RDS1-RDSm of the network RDn and a plurality of path points JCP1-JCPn located at the path sections RDS1-RDSm of the network RDN. For the case of vehicle traffic, the network RDN is a road network RDW, formed for example by a plurality of interconnected roads and streets. The path points ICP1, ICP4 and ICPn are for example crossings or roads whilst the path points ICP2, ICP5, ICP5' can be merely turning points in the road network. Likewise, the path point JCP5 could merely be point, which divides a straight section into two path sections RDS8, RDS9. Thus, in the case of objects formed by vehicles C1-Cx, vehicles move along the respective road sections RDS1-RDSm and pass the respective paths or road points JCP1-JCPn. The other layers SAL, TCL, CL, TSL are provided for managing this object traffic in the physical layer PL.

In particular, the traffic control layer TCL comprises a packet switched control network PSCN whose topology is a clear mapping of the road network RDN on the physical layer PL. In the packet switched control network PSCN a plurality of packets CP1-CPx are routed along a plurality of packet routing links PRL1-PRLm and this packet traffic is controlled by a plurality of packet control units PCU1-PCUn in accordance with the invention located at the packet routing links PRL1-PRLm.

As can be seen from FIG. 2, the packet-switched control network PSCN on the traffic control layer TCL is configured in such a way that packing routing links PRL1-PRLm correspond to path sections RDS1-RDSm, packet control units PCU1-PCUn correspond to the path points JCP1-JCPn and each packet CP1-CPx routed along a-respective packet routing link PRL1-PRLm corresponds to one object CR1-CRx moving on a corresponding path section RDS1-RDSm. The packet control units PCU1-PCUn are adapted to control the packets CP1-CPx on a respective packet routing link PRL1-PRLm on the traffic control layer TCL to correspond to or simulate a respective vehicle C1-Cx on a corresponding road section RDS1-RDSm on the physical layer PL.

As also explained above, the packet switched control network PSCN, i.e. its packet control units, can essentially operate in two different modes of operation, namely in the passive mode (monitoring) and the active mode (guiding).

In the passive mode packets CP1, CP2, CPm are routed along the packet routing links PRL2, PRL4, PRLm to fully correspond to the movement of the corresponding vehicle C1, C2, Cx on the respective corresponding road section RDS2, RDS4, RDSm.

In the active mode a routing method is used and predetermined in the packet switched control network PSCN, for example predefined by one of the servers SERV1, SERV2, . . . , SERVs of the service application layer SAL and such a routing method can for example be one of the group consisting of RIP, OSPF, BGP and a configuration higher level intelligence provided by a server in the service application layer SAL of the system.

Essentially, each packet control unit PCU comprises, for controlling the packet traffic, a transmission device TR (see FIG. 5b) adapted to send as a source packet control unit, e.g. PCU1, respective packets, e.g. CP1, onto a packet routing link, e.g. PRL3, to a succeeding target packet control unit, e.g. PCU3, on the basis of the respective routing decision in accordance with a predetermined packet routing method used in said packet switched control network PSCN for the controlling of said packet traffic. The succeeding target packet control unit can for example by the packet control unit PCU3 or the packet control unit PCU2, depending on the respective routing decision.

In the passive mode (monitoring) the routing decision will be dependent on and will follow the vehicle movement, for example, if the vehicle C1 decides to take the road section RDS3, the routing decision in the corresponding packet control unit PCU1 will be to route the packet CP1 onto the corresponding path section PRL3.

In the active mode, the routing decision may be taken by the packet control unit PCU1 autonomously, in accordance with the routing method defined or predetermined by the service application layer SAL or defined in the packet switched control network PSCN. In such a case the packet control unit PCU1 will take the routing decision, for example to the packet routing link PRL5, and the traffic signalling layer TSL will be controlled to output traffic guidance information TG (see also FIG. 1) to the respective car C1, for example through a traffic information unit TIU1 located at the path point JCP1. In this case the packet control unit PCU1 will act as the source packet control unit and the packet control unit PCU2 will act as the target packet control unit.

As also shown in FIG. 2, the traffic management system TMSYS in accordance with the invention also comprises a traffic signalling layer TSL including a plurality of traffic information units TIU1, TIU1', TIU2-TIUn, TIUy in association with each path point. That is, each path point JCP1, JCP2, JCP3, JCP4, JCP5, JCP5', JCPn, JCPn', JCP1' has associated with it a traffic information unit TIU1, TIU2, TIU3, TIU4, TIU5, TIU2, TIUn, TIUy, TIU1' adapted at least to detect the arrival of objects or vehicles C1-Cx at the respective path point and to output a corresponding object arrival information VAI1-VAIy. As shown in FIG. 2 and as indicated in FIG. 1, the traffic information units TIU can be a traffic sign, a light sensor, a traffic unit inside a vehicle, a mobile terminal (GPRS/UMTS) or a W-LAN (for example inside a vehicle).

The traffic information unit TIU can output vehicle-specific or vehicle-unspecific arrival information. For example, a traffic information unit TIU1 can simply detect the arrival of a vehicle C1 at the road point JCP1. Alternatively, the traffic information unit TIU can also detect the arrival of a specific vehicle, for example by reading the number plate or by receiving other identification information from the arriving vehicle C1. If the traffic information unit is provided within the vehicle C1 itself, the traffic information units can—when passing the road point JCP1—output corresponding arrival information. A skilled person knows many other ways, how to implement a traffic information unit which detects the arrival of a vehicle at a respective road point and outputs a corresponding object arrival information and more specific examples of the traffic information units are described in the aforementioned prior art documents (European patent applications).

Whilst the primary function of the traffic information units is to detect the arrival of objects at the respective roads (path) points, the traffic information units TIU1-TIUy can also be adapted, in accordance with another embodiment of the invention, to guide a vehicle onto a specific path section to a succeeding path point corresponding to a target packet control unit determined by the source packet control unit in accordance with the routing decision. For example, the packet switched control network PSCN may—in accordance with its routing method—determine that the vehicle C1 is to be guided to the road section RDS5 rather than to the road section RDS3 and, therefore, the traffic information unit TIU1, for example a traffic light, may indicate as guidance information TG to the vehicle C1 a turning to a right road section RDS5. It may also be understood that such traffic guidance information TG can be provided directly to the vehicle e.g. C1, for example through a vehicle-installed navigation system.

In the active mode (object or vehicle control), as already explained above, problems of an out of synchronisation state may occur if despite the traffic guidance information TG indicating a turn to the right road section RDS5, the vehicle driver of the vehicle C1 nonetheless decides to turn left, i.e. to the road section RDS3. If the packet CP1 corresponding to the vehicle C1 was instead routed to the routing link PRL5, an out of synchronization state occurs because when the vehicle C1 arrives at the path point JCP3, there will not be a corresponding packet at the corresponding packet control unit PCU3. This will be explained with more details with reference to FIG. 3 and FIGS. 4a, 4b.

The information about the object arrival for vehicle arrival at respective path points can be directly provided—for example through the communication layer CL—to the packet control unit PCU corresponding to the path point at which the vehicle arrival was detected. However, the object arrival information can also be provided first to the service application layer SAL which may also receive packet arrival information VAI from the traffic control layer TCL for determining an out of synchronization state.

Whilst it is important for the invention, in order to detect the out of synchronization state, that a state is determined when a traffic information unit detects the arrival of an object at its associated path point and output the corresponding object arrival information and an arrival packet control unit corresponding to the path point does not detect the arrival of a packet corresponding said object, it is not important for the invention in which layer this state is detected. Such an out of synchronization state detection device may be located in the traffic control layer TCL and/or the service application layer SAL and it may detect the out of synchronization state based on the vehicle arrival information from the path points and corresponding packet arrival information from the, packet control units.

Out of Synchronization State (Out-of-Sync) Detection

To illustrate how an out of synchronization state can occur and can be detected in the traffic management system TMSYS shown and described with reference to FIG. 1 and FIG. 2, hereinafter, FIG. 3 shows an extract of a traffic control layer TCL with four traffic control units Rx, Ra, Rb and Rc and a traffic signalling layer/physical layer TSL/PL with four corresponding road points or path points Px, Pa, Pb, Pc. The traffic information units are not separately shown in FIG. 3 and it is assumed that the respective traffic information units are integrated with the road points Px, Pa, Pb, Pc.

FIG. 3 only shows that essential features of the traffic management system TMSYS in accordance with the invention and it is in particular shown in FIG. 3 that vehicle arrival information VAI is provided from the traffic information unit(s) and traffic guidance information TG is provided to the respective traffic information units, if they have the capability to also guide traffic, such as indicating to a vehicle C to turn left or right.

FIG. 3 shows a typical configuration in which the traffic information unit Rx is connected to the traffic information unit Ra via a corresponding packet routing link and in turn the packet control unit Ra is connected via routing links to the packet control unit Rb, Rc. The packet control unit Rb is connected via a respective routing link to the packet control unit Rc. The interconnection on or the topology of the physical layer PL is a mapping of this configuration in the traffic control layer TCL, i.e. on the physical layer, the path point Px is connected through a path or road to the path point Pa and in turn the path point Pa is connected via a path section (road sections) to the road points Pb and Pc. Also the path points Pb and Pc are interconnected through a path section.

Thus, the "object control" adapted routers Ra, Rb, Rc and Rx reside in the packet switched control network PSCN and the physical network control nodes Pa, Pb, Pc and Px (e.g. a board computer inside a car or a sensor along a road) reside in the physical network PL. Furthermore, the relation is not restricted to 1:1. Only in the examples there is a direct mapping of Rx, Ra, Rb, Rc to corresponding path points Px, Pa, Pb, Pc.

As may be understood from FIG. 3, since no mechanisms are available for synchronizing packets and objects in control networks were objects are accompanied and controlled by packets, the control can only be regarded as "best effort" control, since no (detailed) procedures for a synchronization have been described. For example, in spite of a traffic signalling unit (e.g. an on-board-computer in a vehicle) indicating to turn left, the driver decides to turn right (for whatever reason). Such a situation is schematically illustrated with different out-of-synch cases in FIG. 4a and FIG. 4b. Above FIG. 4a the interconnection of the packet control unit Rx, Ra, Rb, Rc is shown for reference to FIG. 3.

Figure 4A:
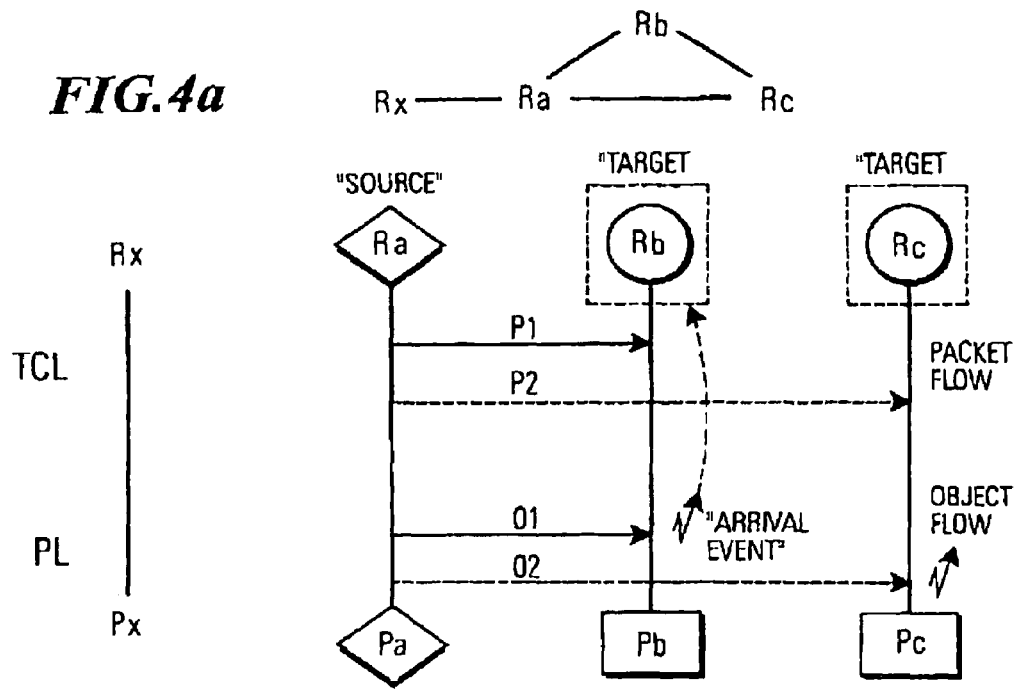
FIG. 4a shows a first example of an out of synchronization state (out-of-sync state) occurring in the configuration of FIG. 3.

In FIG. 4 and in the following FIGS. 5-10 the following symbols are used. A diamond, such as around Ra in FIG. 4a, designates a source packet control unit. A circle, e.g. Rb in FIG. 4a, designates a target packet control unit to which a packet is to be sent from the source packet control unit. As can be understood from the interconnection in FIG. 3, a packet from Ra could be send to "targets" Rb or Rc. The same designation of "diamond" is also used on the physical layer PL, i.e. the diamond around Pa designates that an object leaves this path point to move the path points Pb or to Pc. In all FIGS. 4-10, as for example indicated in FIG. 4a, the upper half respectively relates to units in a traffic control layer TCL and the lower half corresponds to units in the physical layer PL.

A square box, e.g. around Pb, Pc in FIG. 4a, designates a path point or road point where the object or vehicle corresponding to a packet sent from the source packet control unit actually arrives. Furthermore, the outputting of object arrival information VAI is indicated with an "arrival event" denoted with an arrow.

Furthermore, in FIGS. 4-10 the designation "p" designates the movement direction of a packet in the traffic control layer and the designation "o" designates the movement direction of an object (vehicle) on the physical layer PL. Furthermore, a horizontal S-shape line designated with "sig" designates the actual transmission of signalling information from one packet control unit to a succeeding packet control unit, for example from Rx to Ra in FIG. 7b (to be described below). It may be noted that object arrival events, i.e. such "event" messages designated with "sig" may e.g. be based on an extended version of ICMP, i.e. the event messages can be reported by the Internet Control Message Protocol.

Keeping the above definitions in mind, FIG. 4a shows two out-of-sync scenarios, which should actually not occur in a synchronized traffic management system. That is, the packet control unit Ra, acting as the source packet control unit, sends p1 a packet to the target packet control unit Rb. As indicated with the dashed line p2, the source packet control unit Ra may also determine, in accordance with its routing decision, to send P2 a packet to the target packet control unit Rc. If the packet is intended to be send to Rb and also an object moves o1 to a corresponding path point Pb, the path point Pb (or its respective traffic information unit) will output an "object arrival event" and when both the packet p1 and the object o1 arrive at a target packet control unit Rb and a corresponding path point Pb, respectively, then an in-synchronization state is present in the system. The same would likewise be true if the packet is to be sent p2 to the unit Rc and the object actually arrives at the corresponding path unit Pc.

Figure 4B:
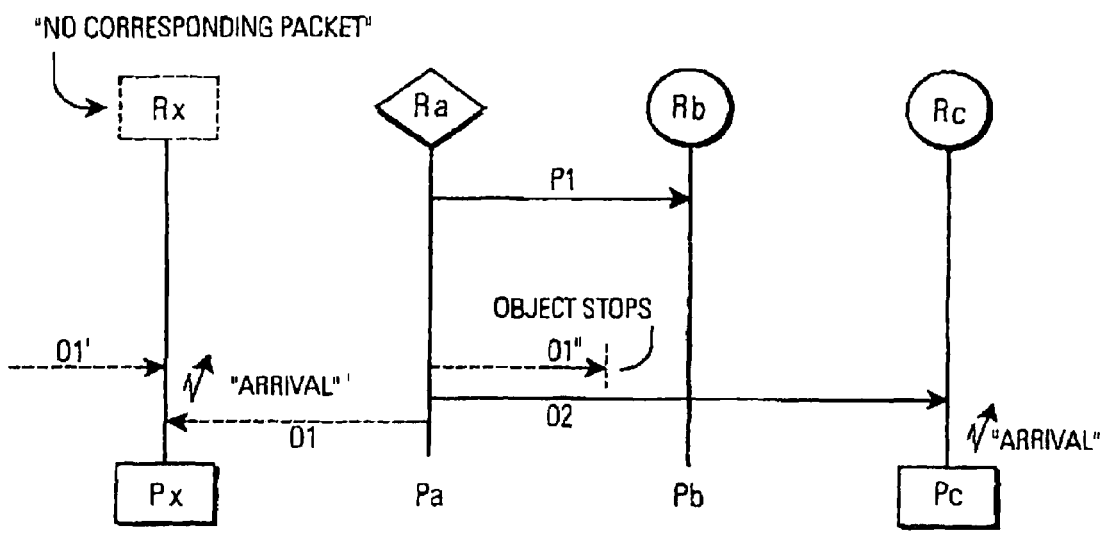
FIG. 4b shows a second example of an out of synchronization state (out-of-sync state) occurring in the configuration of FIG. 3.

However, as indicated in FIG. 4b, a first out of synchronization state occurs and is detected if the packet is actually routed to the target unit Rb whilst the object o1 (vehicle) has moved to the path point Px. In this case, the traffic information unit at Px detects the arrival of an object o1 at its associated path point Px and outputs a corresponding object arrival information (arrival) whilst the arrival packet control unit Rx corresponding to the path point Px does not detect the arrival of a packet corresponding to the object—because the packet has actually moved to Rb.

Thus, there is a mismatch between the packet routing and the object movement. The same situation occurs if the object o2 has moved to the path point Pc and the packet was actually routed to Rb.

FIG. 4b shows also two further cases with o1' and o1" for which out-of-sync state occurs. The case o1' shows a situation where a new object suddenly occurs at a path point Px. Such a situation can for example occur when a vehicle is started from a parking lot situated along a road section leading to Px. In such a situation there is also an out of synchronization state because there is one additional object (vehicle) on the physical layer PL for which a corresponding packet is not present in the traffic control layer TCL.

The designation o1" shows a case in which an object (vehicle) which started moving along a path section from Pa to Pb never arrives at Pb because it has stopped movement somewhere in between. Such a situation can for example occur if a vehicle (object) starts moving away from Pa but actually never arrives at Pb because the vehicle driver decides to place the vehicle at a parking lot situated along the road section interconnecting Pa and Pb.

Summarizing, the following out of synchronization states can be distinguished and can be detected in FIG. 4b:
  A. an object (vehicle) arriving at Pc (which is directly connected to Pb corresponding to Rb where the packet was sent) resulting in an object arrival event from Pc;
  B. an object (vehicle) arrives at Px (which is NOT directly corrected to Pb corresponding to Rb where the packet was sent) resulting in an object arrival event in Px;
  C. an object (vehicle) does not arrive at any of the path points P (e.g. it stopped in between) either resulting in now object arrival (meaning that this "out of synchronization state" will be taken care of by the next object arrival event, possibly in another P) or a timeout event.

Except for the timeout event, as described in case C above, case B is the general case covering also the cases A and C. Therefore, case B should be explained again in more detail.

In the example B, the packet is sent from Ra to Rb. Although this is indicated to the vehicle (driver) via a corresponding traffic guidance information TG, the vehicle has obviously driven from Pa to Px (o1 in FIG. 4b). Depending on the re-synchronization described below, the packet will either wait in the buffer in Ra or in the buffer in Rb for an object arrival event from Pb in the physical layer PL, indicating that the vehicle has arrived (and that the routing can continue, i.e. further routing decisions are to be taken). However, the vehicle arrived at Px and an object arrival event is received in Rx. In any case, the re-synchronisation includes the sending of a packet corresponding to the object to the packet control unit corresponding to the path point at which the object arrival was detected by an associated traffic information unit.

Re-Synchronization Mechanisms in Accordance with the Invention

Figure 5A:
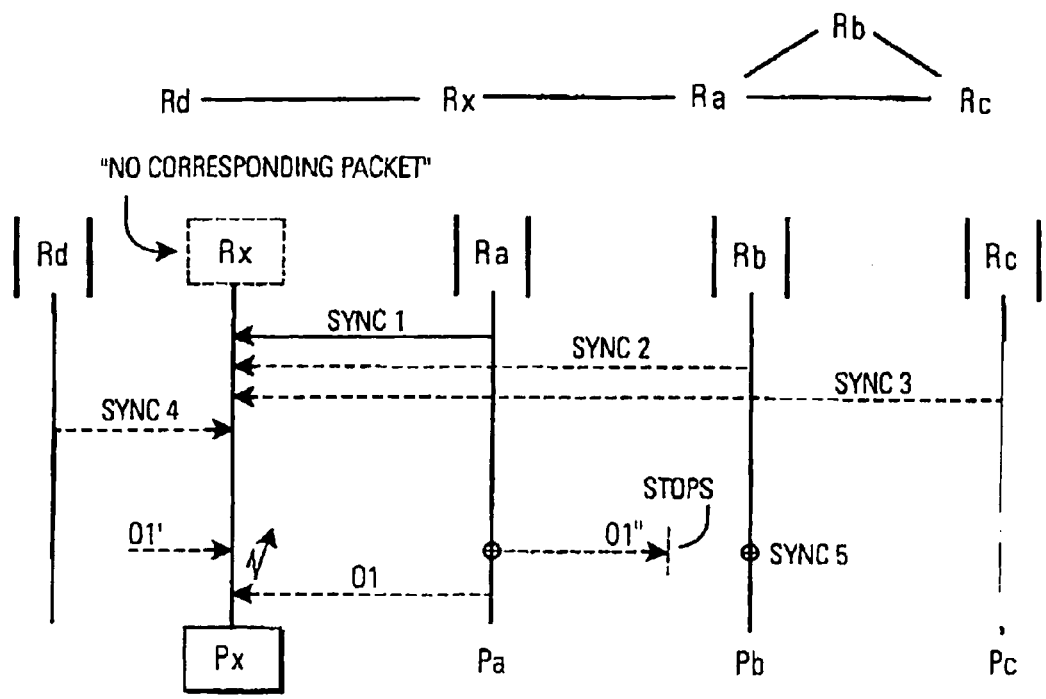
FIG. 5a shows a principle overview of the re-synchronization mechanisms and the methods in the traffic management system including packet control units in accordance with the first, second and third aspect of the invention.

FIG. 5a shows a principle overview for re-synchronization procedures in accordance with the principle of the invention.

Figure 5B:
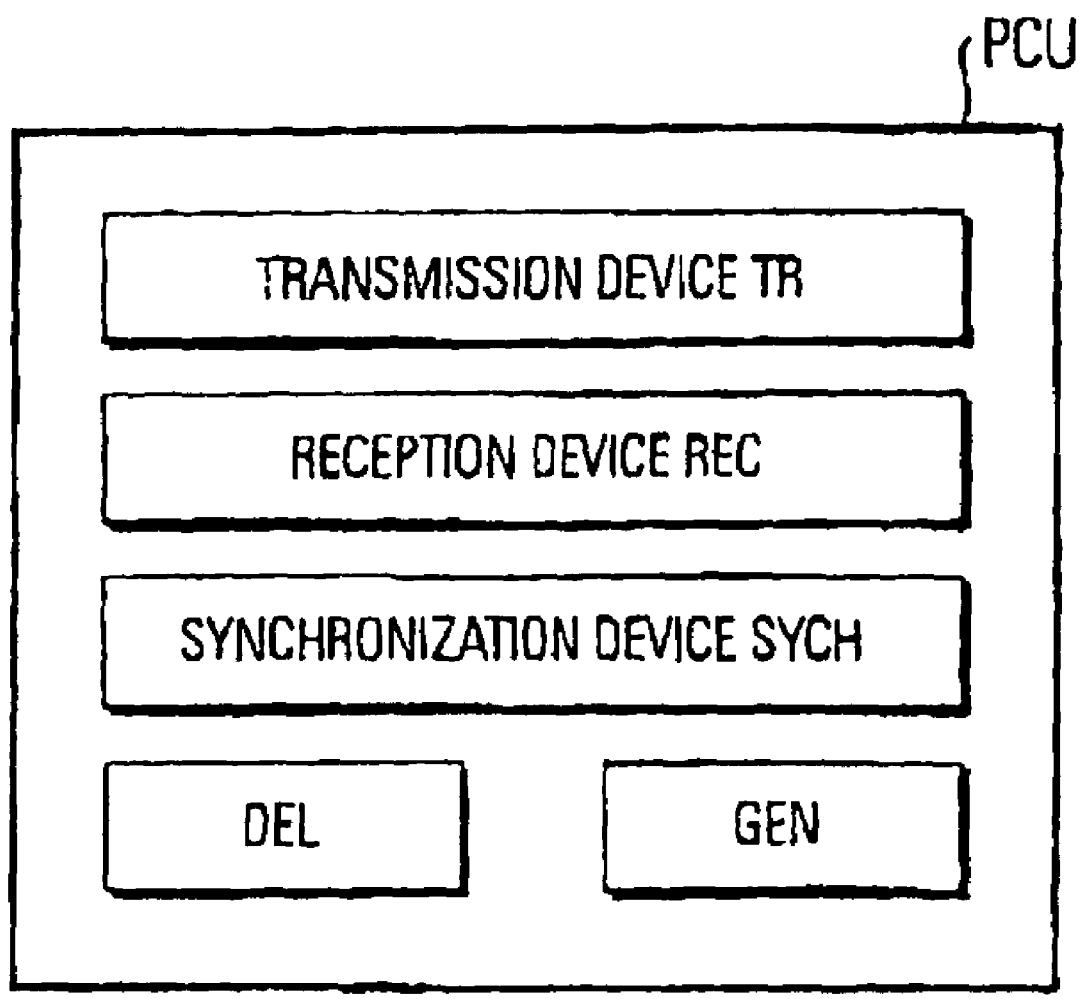

FIG. 5b shows a principle overview of a packet control unit PCU adapted for the re-synchronization procedures in accordance with the principle of the invention.

In addition to the definitions made above, designations with two vertical lines, e.g. |Rd|, |Ra|, |Rb| and |Rc| in FIG. 5a, designate a so-called synchronization packet control unit which is adapted to send a packet corresponding to an object to the arrival packet control unit which corresponds to the path point to which an object has moved. The synchronisation device of such a synchronization packet control unit synchronizes the packet routing and the object movement if a traffic information unit, for example situated at Px in FIG. 5a, detects the arrival of an object o1 at its associated path point and outputs a corresponding object arrival information (arrow) and the corresponding arrival packet control unit Rx corresponding to this path point Px does not detect the arrival of a packet corresponding to the object.

As already briefly explained above and as shown in FIG. 5b, one or more of the packet control units PCU for being included in the packet switched control network PSCN comprises a transmission device TR, a reception device REC and in particular a synchronisation device SYNC. As already mentioned above, the transmission device TR is adapted to send, for example as a source packet control unit, respective packets onto a packet routing link to a succeeding target packet control unit on the basis of a respective routing decision in accordance with a predetermined packet routing method used in said packet switched control network PSCN in order to perform a control for the packet routing. That is, depending on the routing decision, the transmission device TR will send a packet to an adjacent packet control unit via a packet routing link.

In accordance with a first aspect of such a packet control unit PCU, the function of the reception device REC is to receive packets from other packet control units PCU1-PCUn of said packet switched control network PSCN and at least one object arrival information VAI1-VAIy indicating the arrival of an object CR1-CRx at one of said path points Px; ICP1-ICPn wherein said synchronisation device SYNC is adapted to cause the sending of a packet corresponding to said object to the packet control unit e.g. Rx corresponding to said path point e.g. Px at which the object arrival was detected by its associated traffic information unit. This function of the synchronisation device SYNC is in particular useful for the synchronisations shown in FIGS. 6a, 6b, 7a, 7b, 8 and 10 and the synchronisations shown with syn1, sync2, sync 3, sync 4 in FIG. 5a. That is, in the first aspect, the packet control unit, or more precisely its synchronisation device SYNC, will take care that a packet corresponding to an object will be sent to the packet control unit which corresponds to the path point at which the object has arrived. This first aspect may be seen as considering the synchronisation packet control unit as the "sending side" responsible for causing the "sending" of a packet to the relevant packet control unit.

In accordance with a second aspect of such a packet control unit PCU, the function of the reception device REC is to receive packets from other packet control units PCU1-PCUn of said packet switched control network PSCN and an object arrival information VAI1-VAIy indicating the arrival of an object CR1-CRx at the path point Px; ICP1-ICPn corresponding to itself. The synchronisation device SYNC in accordance with the second aspect is adapted yet again, as in the first aspect, to cause the sending of a packet corresponding to said object to the packet control unit Rx if a received object arrival information indicates the arrival of an object CR1-CRx at the path point Px; ICP1-ICPn corresponding to itself, wherein said reception device REC is also adapted to receive said sent packet corresponding to said object. That is, in the second aspect the synchronisation device SYNC is actually located in the packet control unit which corresponds to the path point at which an object arrival was detected for an object for which a corresponding packet is not present in said packet control unit. Thus, in this case, the packet control unit receives the object arrival information and actively pursues to be sent a packet. This type of synchronisation may be seen useful in particular for the synchronisation steps of packet control unit Rx in FIG. 8 and sync1, sync2, sync 3, sync 4 in FIG. 5a. One can say that the second aspect considers the "synchronisation" packet control unit as one which causes the sending of a synchronisation packet to itself on the basis of the object arrival information received from the path point corresponding to the packet control unit.

In accordance with a third aspect of such a packet control unit PCU, the function of the reception device REC is to receive packets from other packet control units PCU1-PCUn of said packet switched control network PSCN and object arrival information VAI1-VAIy indicating the arrival of objects (CR1-CRx) at one or more path points (Px; ICP1-ICPn) wherein said synchronisation device SYNC is adapted to delete a packet in said packet control unit e.g. Ra; Rb if an object arrival information VAI1-VAIy indicating the arrival of an object corresponding to said packet at a path point Pb is not received within a predetermined time interval p1-p2 by said reception device REC. Such a packet control unit may be useful in the synchronisation procedure in FIGS. 9a, 9b and for the synchronisation sync5 and sync6 in FIG. 5a. One can say that the third aspect considers a packet control unit whose synchronisation device SYNC causes a re-synchronisation by deleting packets which do not have a corresponding object in the road network at a corresponding path point.

As also shown in FIG. 5b, the packet control unit PCU, in accordance with some embodiments explained below, can also comprise a deletion device DEL for deleting packets and/or messages (e.g. in FIG. 7a, a deletion of a packet in Rb when a copy of a packet is sent to Rx from Ra; in FIG. 7b, a deletion of a packet link information PLI; in FIG. 8, a deletion of a packet search request PFWD or a search packet SP; in FIGS. 9a and 9b, a deletion of a timed-out packet).

Furthermore, in some embodiments, also to be explained below, the packet control unit PCU can comprise a generation device GEN for generating a new packet (e.g. in FIG. 10, the generation of a new packet if a new object occurs in the road network).

In FIG. 5a, the synchronization sync1 relates to the case where the synchronization packet control unit is the unit Ra. In this case the packet will wait in the buffer in Ra and will be forwarded to Rx, which corresponds to Px where the object has arrived. In this case, Ra corresponds to the packet control unit of the first aspect and Rx corresponds to the packet control unit of the second aspect.

In the synchronization sync2, the synchronization packet control unit is the unit Rb, i.e. the packet for synchronization is sent from the buffer in Rb for the object arrival event from Px. Since Rb is indirectly connected to Rx through Ra, the packet from Rb will be sent to Ra and then to Rx. In this case, Ra and Rb correspond to the packet control unit of the first aspect and Rx corresponds to the packet control unit of the second aspect.

In the synchronization sync3 the synchronization packet control unit is the unit Rc and, since Rb is connected to Rx via Ra, the packet is routed from Rc to Rx through Ra. In this case, Ra and Rc correspond to the packet control unit of the first aspect and Rx corresponds to the packet control unit of the second aspect.

In the synchronization sync4, a re-synchronization takes place for a case where a new object (vehicle) o1' occurs in the physical layer PL. In this case, the synchronization packet control unit can be any of the packet control units Rd, Ra, Rb, Rc. The synchronization packet control unit, for example Rd, will carry out a synchronization sync4 in which a new packet is generated and sent to the packet control unit Rx which corresponds to the path point Px, where the new object o1' appears. In this case, any of Ra, Rb, Rc, Rd corresponds to the packet control unit of the first aspect and Rx corresponds to the packet control unit of the second aspect.

In the synchronization procedure sync5 and sync6, the out of synchronization state occurs because an object o1" stops moving between the path points Pa and Pb. In this case either the source packet control unit Ra or the target packet control unit Rb (assuming that the object is to move from Pa to Pb and a corresponding packet is to move from Ra to Rb) can serve as the synchronization packet control unit. If the packet corresponding to the object o1" is still present in the buffer of Ra, the synchronization sync6 involves the cancellation of the packet in the Ra buffer after a certain timeout delay. If the packet has already been transmitted to Rb, the synchronization packet control unit Rb will cancel in the synchronisation sync5 vthe packet in the Rb buffer if after a certain timeout delay no object arrival is detected in Pb. In this case, Ra and Rb corresponds to the packet control unit of the third aspect.

Figure 6A:
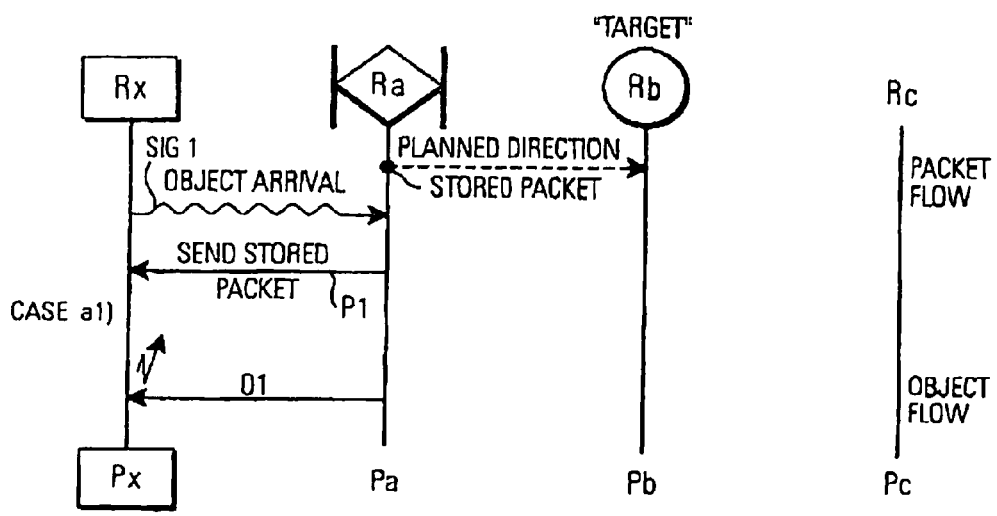
FIGS. 6a, 6b illustrates a first embodiment of the traffic management system TMSYS in accordance with the invention, showing in particular the case when an object stored at a source packet control unit is sent to a packet control unit which corresponds to the path point at which the object has.
Figure 6B:
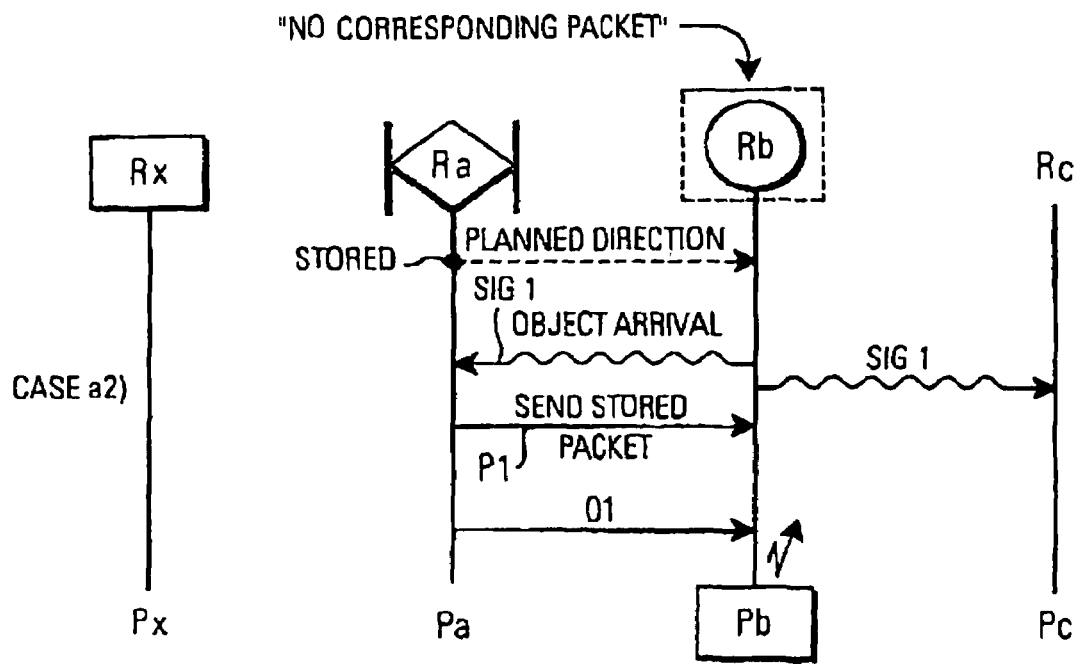

How the synchronization procedures sync1-sync6 are particularly realized in accordance with embodiments of the invention is described below with reference to FIGS. 6-10. Herein, FIGS. 6*a* and 6*b* show re-synchronization procedures in accordance with the principle of sync1 (first and second aspect packet control units), i.e. synchronization procedures for "packet sending upon object arrival event".

Figure 7A:
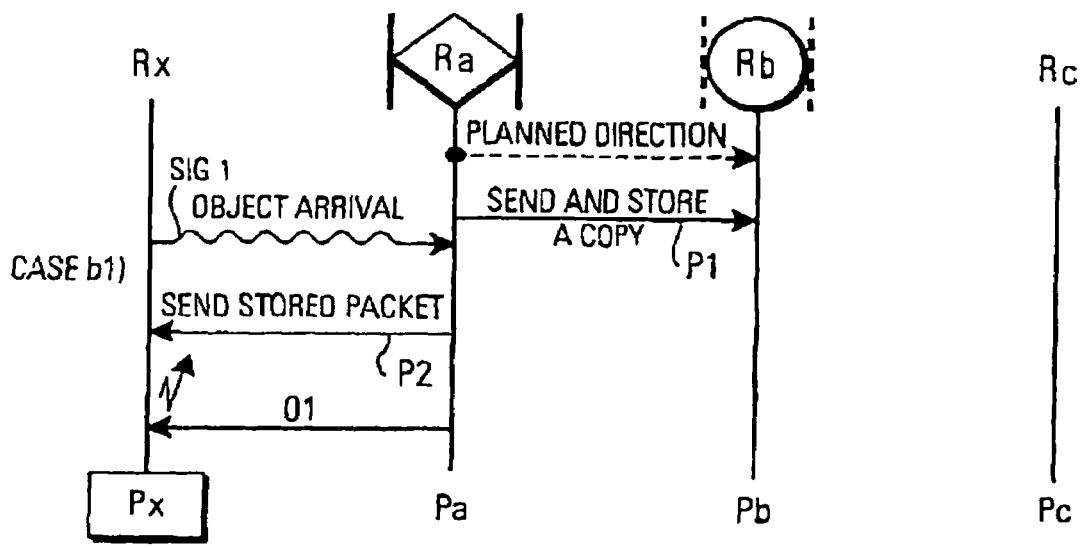
FIGS. 7a, 7b show a second embodiment of the traffic management system TMSYS in accordance with the invention, in particular showing the case where a copy of a packet is stored at a source packet control unit and packet link information PLI is used to identify the packet control unit to which the packet was sent.
Figure 7B:
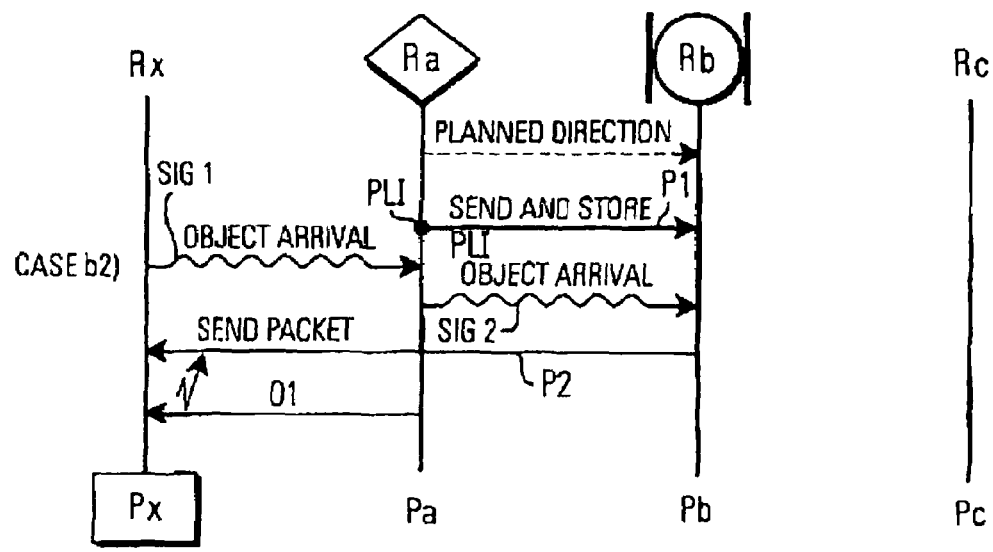

FIGS. 7*a*, 7*b* show synchronization procedures in accordance with sync1/sync2 for cases for "packet sending after routing decision is taken" (first and second aspect packet control units).

Figure 8:
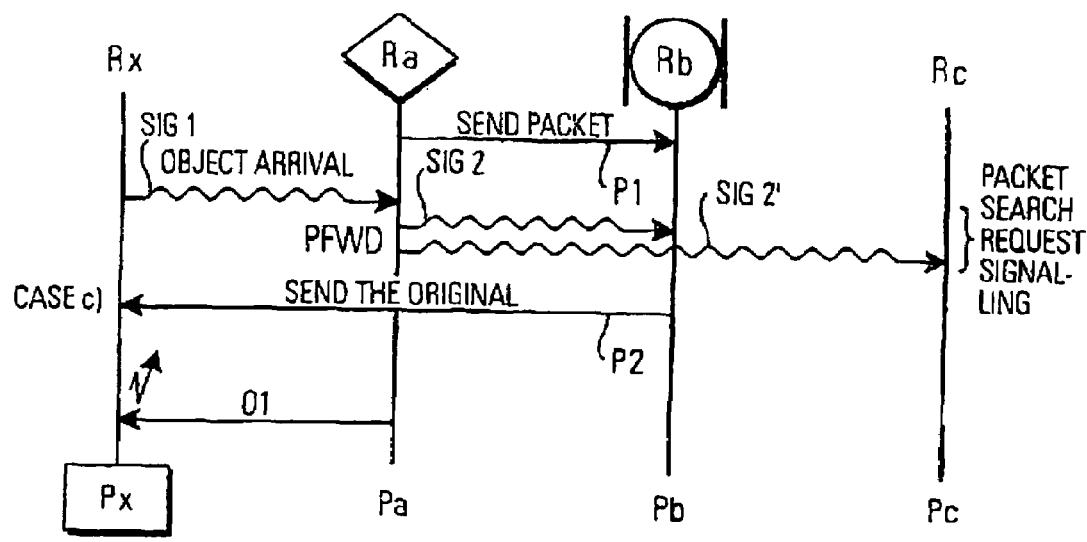
FIG. 8 shows a third embodiment of the traffic management system TMSYS in accordance with the invention, showing in particular the case where object arrival signals sig1, sig2, sig2' are broadcast to succeeding packet control units to find out at which packet control unit the sent packet.

FIG. 8 shows a synchronization procedure essentially in accordance with sync2, where the trigger for sending the packet for synchronization from Rb is based on a "two-stage broadcast/multicast" (first and second aspect packet control units).

Figure 9A:
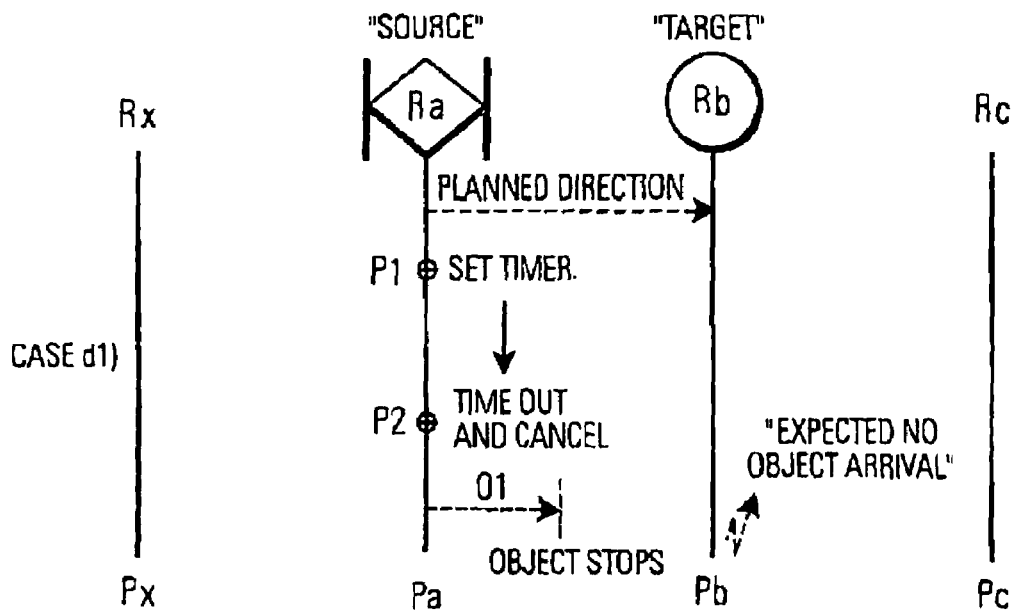
FIGS. 9a, 9b show a fourth embodiment of the traffic management system TMSYS in accordance with the invention, in particular showing the case of a re-synchronization if an out of synchronization problem occurs because an object stops movement between two path points.
Figure 9B:
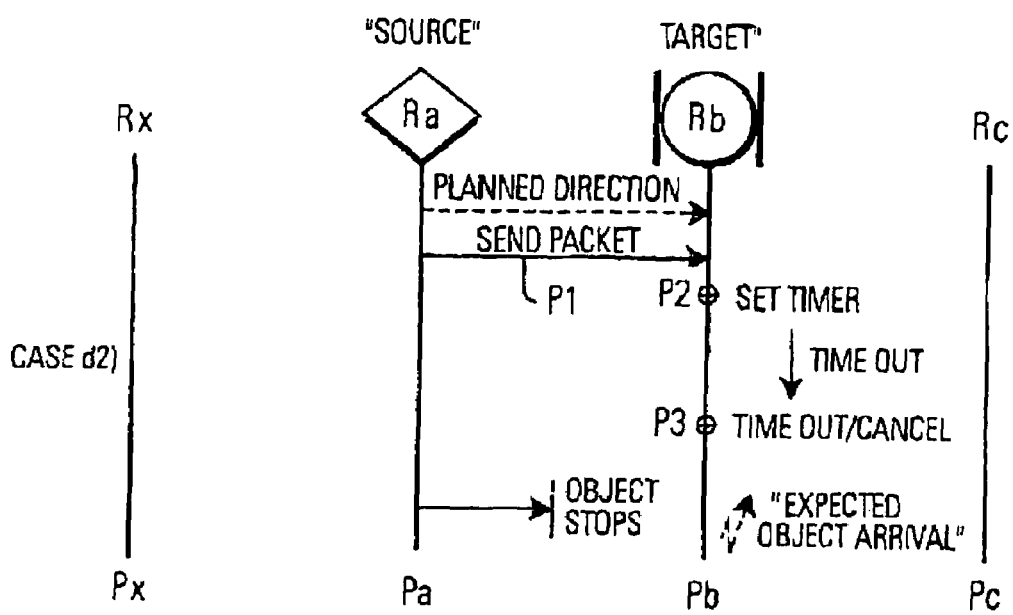

FIGS. 9*a*, 9*b* show synchronization procedures for sync5 "packet timeout" (third aspect packet control units).

FIG. 10 shows a re-synchronization procedure in accordance with sync4 for "generation of a new packet".

Before coming to a more detailed description of the embodiments in FIGS. 6-10, the following can be understood from the re-synchronization procedures in FIG. 5*a*. That is, whenever—due to certain circumstances in the object movement and/or the packet routing—a situation occurs in which the synchronization between a packet and a corresponding object or an object and its corresponding packet gets lost, one or more of the packet control units of the packet switched control network PSCN will control the packet flow on a traffic control layer TCL on the basis of the object arrival information in such a manner that it is always ensured that an object and a packet correspond to each other at the appropriate packet control unit and its corresponding path point.

In other words, a synchronization device of a packet control unit will send the packet to the packet control unit "where it belongs", namely to that packet control unit whose corresponding path point has detected the arrival of an object corresponding to the packet. In this manner, re-synchronization can be achieved, even if the packet routing gets out of step with the object movement. This is even valid for the case where a new object appears in the physical layer because in this case the control in the packet switched control network will ensure that a new packet is generated and is being sent to the packet control unit corresponding to the path point where the new object appeared.

Alternatively, in case that an object disappears (stops) from the physical layer PL (i.e. is not included in the object movement process in the physical layer PL any longer), the re-synchronization involves a timeout of the packet corresponding to the stopped object either in the source or in the target packet control unit. Also in this case the re-synchronization is based on the last received object arrival information from the path point at which the stopped object was situated before it disappeared (stopped). The re-synchronization takes this object arrival information as the last occurrence of the object and if no further object arrival information occurs for this object from any of the succeeding path points, the re-synchronization entails the cancellation of the packet, which corresponds to this disappeared object.

Consequently, in all out of synchronization state cases described above there will be at least one synchronization packet control unit, which performs a control for the packets in the packet switched control network such that the number of packets and corresponding objects are the same and that each packet and its corresponding object are routed along the corresponding packet routing links and path sections in the traffic control layer TCL and the physical layer PL, respectively.

For the respective synchronisation procedures explained below, a first aspect, second aspect and third aspect packet control unit will be identified in the respective embodiments. It may be noted that for the respective embodiments a first and second aspect packet control unit is only identified to explain the re-synchronisation procedure from the "sending side" and "receiving side". However, the effect is the same, i.e. the packet control unit respectively receives packets at the respective reception unit REC and its transmission unit TR transmits the packets onto a packet routing link to a target packet control unit.

If a packet control unit detects—on the basis of object arrival information—that an out-of-sync situation occurs in which an object is present at a path point and no corresponding packet is present in the packet control unit corresponding to this path point (or in which a packet is present at a packet control unit and no corresponding object is present in the path point corresponding to this packet control unit), the packet control unit causes the sending of a packet to another packet control unit corresponding to the path point where the object arrived. If the packet control unit is actively sending the packet it is the first aspect packet control unit and if it is actively receiving the packet it is the second (another) aspect packet control unit. Thus, it may be understood that there is no necessity to have the first and second aspect packet control unit present in the packet switched control network simultaneously.

Packet Sending Upon Object Arrival Event

In the first embodiment the packet is stored in the source packet control unit Ra after the routing decision is taken to route the packet to Rb (and the Packet Switch Control Network PCSN) is informed accordingly). Upon arrival of an "Object Arrival Event" (either form Rb or any other packet control unit), the packet is sent to the packet control unit corresponding to the path point at which the object has arrived. FIG. 6*a* and FIG. 6*b* show two different examples of this embodiment.

In case d1) the source packet control unit Ra (indicated with the "diamond") has decided, based on the routing decision in accordance with the routing method, that the packet is to be transmitted to a target packet control unit Rb ("planned direction"). In FIG. 6*a* the packet is first stored in the source packet control unit Ra (indicated with a filled circle ●). As indicated in FIG. 6*a*, however, the object situated at the path point Pa corresponding to the source packet control unit Ra has actually moved o1 to the path point Px. As explained above, the reasons for this movement can be manifold. For example, despite the fact that the traffic information unit situated at the path Pa might have indicated to the object (vehicle) to turn to the path section leading to Pb (traffic guidance), the vehicle (object) might have decided to take another route along the path section leading Px.

Alternatively, even if no traffic guidance is provided (passive mode) there may be simply a mismatch in the movement directions of the packet and its corresponding object.

In any case, the arrival of the vehicle at Px causes the traffic information unit associated with the path point Px to output a corresponding object arrival information (indicated with the arrow). As indicated with the communication layer CL in FIG. 1, the object arrival information VAI is transferred to the corresponding packet control unit Rx and thus Rx notices that it does not have a corresponding packet for the vehicle (object) which has arrived at Px. The packet control unit Rx will now send, using its transmission device TR, a signalling message sig1 "object arrival" to all its neighbouring packet control units because the packet missing at Rx must be present somewhere in one of the neighbouring packet control units if a checking of object arrival information is always made at each packet control unit. Viewing Rx as the second aspect packet control unit, the synchronisation device SYNC of Rx uses the signalling message sig1 to cause one of the other packet control units Ra, Rb, Rc to send a packet in return to this message.

In the case of FIG. 6a, of course the signalling information sig1 is only sent to one neighbouring packet control unit Ra which then sends, using its transmission device TR, the packet stored in the buffer at Ra to the packet control unit Rx in order to re-synchronise the packet to the corresponding vehicle position. Viewing Ra as the first aspect packet control unit, the synchronisation device SYNC of Ra, in response to the signalling message sig1, causes the transmission device TR of Ra to send the packet still stored in the buffer at Ra (i.e. it has not been sent to its target packet control unit Rb, as indicated with the "planned direction") to Rx.

It is also possible that the object arrival information VAI generated by the path point Px is directly sent to all packet control units which are neighbours to Rx, or at least to Ra in FIG. 6a. Also in this case Ra will be the first aspect packet control unit and Rx will be the second aspect packet control unit.

Thus, in FIG. 6a, the synchronisation device is in the source packet control unit Ra for the first aspect and is in the arrival packet control unit Rx for the second aspect, the sent packet corresponding to the object is the packet stored at the source packet control unit and the arrival packet control unit Rx is not the target packet control unit Rb.

In one embodiment, in FIG. 6a, the object arrival information generated from Px is communicated to the packet control unit Rx which checks whether a packet is present corresponding to the object. If not, it will send the signalling information sig1 to its neighbouring packet control unit such that the source packet control unit can perform the re-synchronisation by sending the packet in step p1. The "checking" in the packet control unit Rx "whether a packet corresponding to the object is present" can be done in many different ways.

A first possibility is that the packet control unit Rx, when receiving the object arrival information from Px, simply checks whether any packet at all has arrived from Ra. If it does not detect the arrival of a packet from Ra it can detect that the packet is not present. This causes then the sending of the signalling message sig1.

A second possibility is that the packet control unit Rx merely looks into its buffer to see whether presently a packet is present. This assumes that each packet control unit can only store a single packet and in this case, when the packet control unit Rx does not detect the presence of a packet in its buffer, it can conclude that a packet from Ra has not arrived. Also this causes then the sending of the signalling message sig1.

Of course, it should be understood that the packet routing in the packet switched control network PCSN is much faster than the object movement on the physical layer PL. Therefore, normally, if there is a packet transferred from Ra to Rx, the packet control unit Rx should receive the packet before the object arrives. In other words, when in the normal operation packets are always faster than objects, it is enough to check in RX—when the object arrival information has been transferred from Px—whether any packet at all has arrived from Ra (first possibility) or whether a packet is present in Rx (second possibility).

Conversely, in a rare case where the packet routing should be slower than the object movement, in such a case a certain time period needs to be set in Rx and this time period has to elapse before the definite decision can be taken that a packet corresponding to the object in Px is not present in Rx.

In case a1) in FIG. 6a the stored packet in Ra is sent to Rx, if upon receiving of the object arrival information from Px, the packet control unit Rx does not detect the presence or arrival of a packet corresponding to the object arrived at Px. The case a1) in FIG. 6a shows the transfer and re-synchronisation of a single packet on a non-vehicle-specific basis.

However, it may be noted that the procedure in FIG. 6a can likewise be carried out on a vehicle-specific basis. In this case, vehicle-specific object arrival information can be output from the arrival path point Px (i.e. from its traffic signalling unit, and the packet control unit Rx will look for a specific packet having a specific header field which identifies that the specific packet is the corresponding packet to the object which has arrived at Px.

Therefore, in the present invention "packet-corresponding to the object" may be understood as being non-vehicle-specific or vehicle-specific. In the former case, it is assumed that always only one packet is transferred and one object is transferred along a routing link and a path section. In the latter case, several packets and several objects may be transferred on a routing link and a path section and therefore a vehicle-specific or object-specific evaluation of object arrival events may be performed.

For example, it may well be that one vehicle driving from Pa to Px overtakes another vehicle along the same path section. If no individualised management of the traffic is intended, it may still be enough to simply check the arrival of two different objects in Px. However, if for example the first vehicle is a truck and the second vehicle is a passenger car, it may be necessary to route the truck along one certain path section and the passenger car to another path section. In this case it is indeed important to detect which object or vehicle arrives first at the path point Px such that object-specific arrival information is generated and the corresponding packet control unit Rx performs a object-oriented evaluation of arriving packets.

The aforementioned scenario of an individualised routing and synchronisation is indeed one of the possible scenarios because the traffic guidance information TG may be provided to objects on an individualised basis, for example all trucks turn left and all passenger cars turn right. Therefore, if the traffic control layer TCL performs the routing of packets and the traffic control for individual objects and vehicles, also the re-synchronisation, such as in FIG. 6a, has to be carried out on an individualised basis. The same is true for the examples and embodiments described hereinafter with respect to FIG. 6b and FIGS. 7-10.

With respect to the signalling method sig1 which is sent by Rx to all its neighbouring packet control units—since the accompanying packet must be stored in one of the neighbours—one embodiment of transferring this signalling message sig1 is through the internet control message protocol (ICMP) and the transfer may be based on broadcasting (or multicasting) principles. However, since Ra will detect the stored packet, all other neighbouring packet control units will simply ignore the message since they do not know about the accompanying packet.

As indicated in a traffic control layer TCL in FIG. 2, an evaluation unit EVAL can be provided in the packet switched control network PFCN and the evaluation unit EVAL is adapted to generate statistics and/or charging information about the packet movement in the packet switch control network. However, the charging and statistics (interfaces) may be also handled by the packet control units Ra and/or Rx because they have the information about the packet movement.

The second example case a2) of the first embodiment as shown in FIG. 6b. FIG. 6b shows an example where the reception unit in Rb, which is the target packet control unit, receives an object arrival event from Pb. In principle, this situation is not very different from the one shown with p1, o1 in FIG. 4a. However, in FIG. 6b, since the packet is sent upon the object arrival event, i.e. after the routing decision is taken—the packet is first stored in Ra and the object moves to Pb which in FIG. 6b is indeed the desired target path point. However, upon generating the object arrival event (arrow) in Pb the packet from Ra has not arrived in the corresponding target packet control unit Rb (causing a situation of "no corresponding packet" in FIG. 6b). Since the packed control unit Rb does not detect the presence or arrival of a packet corresponding to the object which has arrived at Pb it broadcasts signalling messages sig1 to its neighbouring packet control units Ra, Rc because in one of the two neighbouring packet control units because the packet must be present (unless it is lost somewhere). Ra detects the presence of a packet and therefore sends in step p1 the packet to the target packet control unit as planned.

Therefore, in FIG. 6b, Rb (which happens to be the target packet control unit) may be considered the second aspect packet control unit because it receives the arrival information and causes Ra—through the signalling message sig1—to send a packet to it. In turn, Ra will be the first aspect packet control unit.

Case a2) may be seen as the normal routing procedure where the packet from the source packet control unit does arrive in the target packet control unit. However, due to timing problems (packet routing being normally faster than object), it may be useful to perform the routing of packets in such a manner that always the packet is first stored in the source packet control unit, such as Ra, before it is sent—in response to the object arrival signalling message sig1—to the target packet control unit. Thus, a re-synchronisation may also be performed in the "normal" routing of packets from source to target packet control unit when indeed the object also moves from the source path point to the desired target path point, however with some time delay therebetween which would normally cause the target packet control unit to detect an out-of-sync state because it cannot detect immediately after the arrival of an object also the arrival of a packet corresponding to the object in its buffer.

As may be understood from FIG. 6b, in this embodiment the synchronisation device is in the source packet control unit Ra for the first aspect and in the target packet control unit Rb for the second aspect, the sent packet corresponding to the object is the packet stored at the source packet control unit Ra and the arrival packet control unit is the target packet control unit Rb. The embodiments in FIGS. 6a, 6b clearly solve the out-of-sync-states shown in FIGS. 4b, 4a, respectively, because a packet is sent respectively to Rx and Rb corresponding to a path point Px, Pb where an object arrived.

Packet Sending After Routing Decision is Taken

The second embodiment of the system in accordance with the invention is shown in FIGS. 7a, 7b. FIGS. 7a, 7b show two examples where the packet is sent to and stored in Rb after the routing decision is taken to route the packet to Rb (and the packet switch control network PCSN is informed accordingly).

In case b1) in FIG. 7a a copy of the packet is kept in Ra and in case b2) FIG. 7b a link to Rb (for the specific packet) is kept in Ra in order to be able to handle the re-synchronisation cases. An accompanying indication may be stored to indicate which packet is the original and which packet is the copy in case b1). Upon arrival of an "object arrival event" from Px the transmission device TR of the source packet control unit Ra will forward the stored packet (in case b1)) or the transmission device TR of the source packet control unit Ra will order Rb to send the packet to Rx (case b2). Thereafter, upon detecting the packet arrival in Rx, the packet copy in Ra (case b1) or the link in Ra (of case b2) is deleted.

With more details, in FIG. 7a the source packet control unit Ra plans to send a packet to the target packet control unit Rb. Before sending it, Ra stores a copy of the packet in a buffer (indicated with a filled circle ●). Since the object has moved o1 to a path point Px not corresponding to the target packet control unit Rb (i.e. has not moved to Pb) an object arrival event is generated from the traffic information unit located at Px. Similarly as in case a1), the packet control unit Rx receives this object arrival information and sends to all its neighbouring packet control units (in the case of FIG. 3 and FIG. 7a only one neighbouring packet control unit Ra) the signalling message sig1.

Upon receiving of the signalling message sig1 the source packet control unit Ra forwards the stored copied packet in step b2 to the packet control unit Rx corresponding to the path point Px where indeed the object has arrived. Therefore, in FIG. 7a the source packet control unit Ra is adapted to store a copy of the sent packet, the synchronisation device SYNC is in the source packet control unit Ra and the sent packet is the copy of the packet. In FIG. 7a, Rx and Ra may be viewed as a first aspect packet control unit because each of them cause a packet to be sent to Rx (Rx: through sending of the signalling message sig1; Ra: through sending of the copy of the packet). Rx can also be viewed as a second aspect packet control unit because it receives the packet arrival information, requests (causes) the sending of a packet and receives this packet.

As already mentioned above, when the stored copy packet has finally arrived in the packet control unit Rx, Rx may signal this to Ra which can then instruct Rb to delete the transferred (original packet) since otherwise there would be one additional packet present in the packet switch control network PSCN and this additional packet does not find its corresponding object on the physical layer PL.

The second example of the second embodiment in case b2) in FIG. 7b is similar to case b1) in FIG. 7a. The difference in FIG. 7b is that after determining, on the basis of a routing decision, that a packet is to be transferred from Ra to Rb ("planned direction") the packet is indeed sent in step p1 to the target packet control unit Rb. However, the source packet control unit Ra is adapted to store a packet link information PLI (the storage being indicated with the filled circle ●) indicating the target packing control unit Rb to which the packet has been sent. If now the object (incorrectly) arrives at Px and an object arrival information is generated at Px, the transmission device TR of the packet control unit Rx receiving this object arrival information will send a signalling message sig1 to its neighbouring packet control units, in FIG. 7b only to one neighbouring packet control unit Ra, and the packet control unit Ra detects, on the basis of the packet link information, that the packet which Ra has sent to Rb actually should have been sent to Rx.

The source packet control unit Ra is therefore adapted to use the packet link information PLI to instruct the target packet control unit Rb, identified by the stored packet link information PLI, to send the packet to the arrival packet control unit Rx. A signalling message sig2 can be used for instructing the target packet control unit Rb to do so. Of course, since Rb is not directly connected to Rx, the packet present in Rb will be routed to Rx through Ra. Finally, Rx can signal Ra through another signalling message that indeed the packed from Rb has arrived and Ra can therefore subsequently cancel the packet link information PLI from its buffer.

Thus, it may be understood that in FIG. 7b the synchronisation device SYNC is in the target packet control unit Rb and the sent packet corresponding to the object is the packet stored at the target packet control unit Rb.

Similarly as in FIGS. 6a, 6b charging and statistics (interfaces) may be handled by an evaluation unit EVAL in the traffic control layer TCL and/or in the service application layer SAL. The charging and statistics may also be handled by Ra and/or Rx.

The cases b1) and b2) in FIGS. 7a, 7b allow a re-synchronisation because the packet control unit Ra which is the neighbour to the packet control unit Rx corresponding to the path point Px from which the object arrival information was received always keeps either the copy of the sent packet or at least a packet link information PLI. Therefore it is enough to signal to the one or more neighbouring packet control units Ra (i.e. neighbouring Rx) a signalling message sig1, sig2 indicating that a packet corresponding to the object arrived at the path point Px is missing.

In FIG. 7b, Rx, Ra and Rb can be viewed as the first aspect packet control unit because each of them cause a packet to be sent to Rx (Rx: through sending of the signalling message sig1; Ra: through sending of a signalling message sig2 to Rb on the basis of the packet link information; Rb: through sending the packet to Rx). Rx can also be viewed as a second aspect packet control unit because it receives the packet arrival information, requests (causes) the sending of a packet from its neighbours and receives this packet.

Two-Stage Broadcast/Multicast

As was explained with reference to FIG. 6 and FIG. 7, re-synchronisation can take place if either the packet is stored at Ra, (see FIGS. 6a, 6b), a copy of the packet is stored Ra (see FIG. 7a) or at least a packet link information is stored in Ra (see FIG. 7b).

Hereinafter, a third embodiment of the system in accordance with the invention will be described and in this embodiment the re-synchronisation solution is performed in such a way that the packet is sent to and stored in the target packet control unit Rb after the routing decision is taken to route the packet to Rb (and the packet switch control network PSCN is informed accordingly). In the third embodiment neither a copy nor a link is kept in Ra and upon receipt of an object arrival event from Px, Ra will do a second level broadcasting/multicasting to all its neighbours (except Rx), since Rx may not know the location of the packet and the packet must be stored in one of these neighbours. In case Rb is connected to Rx (contrary to FIG. 3), it would receive the notification directly from Rx. In that case no second level broadcasting/multicasting would be needed. Both Rb and Rc received a notification from Ra and Rc will simply ignore the message since it does not have any information about the packet (and two floodings have already been done). It should be noted that a "number of floodings" done indicator is needed in order that the packet control units know whether another flooding is to be done. For example, a time-to-live-field in the IP packet header may be used for this purpose or an additional option/extension in the IP packet header may be used for that. Since Rb knows about the packet, it will forward the packet Rx.

With more details, as shown in FIG. 8, the source packet control unit Ra takes the decision to send a packet to Rb which is the target packet control unit. In step p1 the packet is sent by the transmission device TR of Ra. In the meantime, the object has moved from Pa to Px and a corresponding object arrival information is generated by the traffic information unit located at Px. Rx receives this object arrival information and its transmission device TR sends a first signalling message sig1 about the object arrival to Ra. Rx does so because it cannot detect the presence of a packet corresponding to the object which has arrived at Px. In the signalling message sig1 Rx signals Ra that the packet corresponding to the arrived object at Px is missing in Rx.

In turn, Ra will broadcast with signalling messages sig2, sig2' a packet search request PFWD. Instead of broadcasting the signalling messages sig2, sig2', also a multicasting is possible. Since the packet was sent to Rb, Rb detects the presence of the packet and sends the original packet back to the requesting packet control unit Rx in step p2. First, in response to the packet search request PFWD, the target packet control unit Rb sends the packet to the arrival packet control unit Rx, wherein the sent packet is the packet stored at the target packet control unit.

Therefore, in FIG. 8 there is neither the necessity to store the packet in the source packet control unit Ra, nor the necessity to store any link information. That is, the packet search request PFWD will find out where the packet is because only the packet control unit Rb where the packet is actually located will detect the presence of the packet which is then returned to Rx. Rc will ignore the message since it does not have any information about the packet.

In FIG. 8, in accordance with one embodiment, said packet search request PFWD can be constituted by a search packet SP sent to said other packet control units Rb, Rc.

Furthermore, in accordance with yet another embodiment, said search packet SP can comprise a life time field indicating the life time of the search packet SP. For example, when the search packet SP is first sent from Ra to Rb, the lift time field may be reset at the time of being sent to Rb and Rb will then update the life time field with the reception time in Rb. In this case, it is advantageous if said packet control units, in particular said adjacent packet control units Rb, Rc comprise a deletion device DEL (see FIG. 5b) adapted for deleting said search packet SP if the life time field indicates a life time exceeding a maximum allowable life time.

Furthermore, in accordance with still another embodiment, said search packet SP may comprise a number-of-hops counter field indicating the number of packet control units through which said search packet SP has been routed. For example, when the search packet SP is received in Rb, Rb will set the counter field to "1", when it is received in Rc, Rc will set the counter field to "2" etc. In this case, it is advantageous if said packet control units, in particular said adjacent packet control units Rb, Rc, comprise a deletion device such as DEL in FIG. 5b adapted to delete said search packet SP if said number-of-hops counter field of said search packet SP indicates a number packet control units exceeding a maximum allowable number.

The usage of the time life field and the-usage of the number-of-hops counter field is advantageous because it can thus be ensured that the search for a missing packet is not continued indefinitely which might cause a blocking of the entire system. That is, if after a predetermined time or after a predetermined number of routed through packet control units the packet is still not located and sent to the packet control unit whose path point has detected the arrival of the corresponding object, it is better to assume that the packet is either very far away (many packet control away for the packet control unit corresponding to the path point) or actually got lost in the packet switched control system such that a new packet replacing the non found or lost packet will generated by a generation device GEN in one of the packet control units and is then sent to the relevant packet control unit.

In FIG. 8, Rx, Ra and Rb can be viewed as the first aspect packet control unit because each of them cause a packet to be sent to Rx (Rx: through sending of the signalling message sig1; Ra: through sending of a signalling message PFWD, sig2 to Rb; Rb: through sending the actual packet to Rx). Rx can also be viewed as a second aspect packet control unit because it receives the packet arrival information, requests (causes) the sending of a packet from its neighbours and receives this packet.

Packet Timeout in Rb

In a fourth embodiment of the system in accordance with the invention a synchronisation problem is solved if the object stops in between a movement between two path points $P_a$ and $P_b$. That is, when a packet in $R_b$ is timed out this means that the vehicle either took another road or it has stopped/is delayed between $P_a$ and $P_b$. $R_b$ may inform an external server about this event (e.g. some control unit that needs to know about this) by means of a message (e.g. an extension to the ICMP). For example, this means that nothing is done until an object arrival event is received from any router in the network.

In case of traffic jams a lot of objects may be out of synchronisation. Since a lot of objects may be timed out almost simultaneously, an "object control" adapted router optionally can wait for a certain time period for the reception of similar timeouts from other objects before processing the aggregated event to e.g. an (external) server. Optionally, a counter of the number of objects effected or all the object identifiers may be added to the aggregated event.

It should be noted that the aggregated event may also apply when multiple objects are simulated by a single packet.

As shown with more details for case d1) in FIG. 9a, after taking a routing decision to route a packet from $R_a$ to $R_b$ a timer may be set in the source packet control unit $R_a$ in step p1. The object starts moving from $P_a$ in step o1, however, stops on the path section connecting $P_a$ and $P_b$. Therefore, $P_b$ does not generate an object arrival information. Since $R_a$ has as yet not sent the packet it sets the timer in step p1 and waits for information from $R_b$ that the object has indeed arrived at $P_b$. If no information is received from $R_b$ within the set time period monitored by the timer, the source packet control unit $R_a$ will cancel the packet and will thus not send the packet to the target packet control unit.

Therefore, when a source packet control unit $R_a$ in FIG. 9a plans to send a packet to its succeeding packet control unit $R_b$ and no object arrival information for an object corresponding to this packet is generated from the traffic information unit at a path point $P_b$ corresponding to the target packet control unit $R_b$ or any other packet control unit, e.g. $R_x$, within a predetermined time interval, deletion device such as shown with DEL in FIG. 5b in the source packet control unit $R_b$ is adapted to cancel said packet instead of sending it to the target packet control unit $R_b$.

Thus, the "synchronisation packet control unit" in FIG. 9a is actually the source packet control unit because it performs a cancellation of the packet to make the number of available packets in the packet switch control network PCSN and the objects in the physical layer PL equal. Therefore, an out of synchronisation state in which the object arrival information is not output by the target path point $P_b$ and only the presence of a packet in the source packet control unit $R_a$ occurs, can be dealt with.

In the second example of the fourth embodiment of the invention, case d2) in FIG. 9b, the time out function is performed in the target packet control unit $R_b$. In the case d2) in FIG. 9b the source packet control unit $R_a$ plans to send a packet to $R_b$ and it does send the packet in step p1 such that the packet is now present in $R_b$. The target packet control unit $R_b$ now sets a timer in step p2 and waits for the arrival of an object arrival information from the traffic information unit situated at the path point $P_b$. Since the object movement has stopped on the path section connecting $P_a$ and $P_b$, the expected object arrival information is not generated (indicated with the arrow with dashed lines in FIG. 9b), and the timer in Rb expires in step p3. In this case, when no object arrival information is received within the predetermined time period, the packet is cancelled in the target packet control unit $R_b$ by a deletion device such as DEL shown in FIG. 5b.

Thus, in FIG. 9b, when a source packet control unit $R_a$ has sent a packet to its succeeding target packet control unit $R_b$ and no object arrival information for an object corresponding to this packet is received from a traffic information unit at a path point corresponding to the target packet control unit $R_b$ or any other packet control unit, e.g. $R_x$ within the predetermined time interval, the target packet control unit $R_b$ is adapted to cancel the packet in $R_b$.

Via the cancellation in $R_b$, the synchronisation packet control unit in FIG. 9b is formed by the target packet control unit $R_b$ (indicated with the vertical lines). Thus, in FIG. 9b the out of synchronisation state in which a packet is present in the target $R_b$ and no object arrives is handled by cancelling the packet in the target after a predetermined time.

As already mentioned above, in the case of traffic jams for vehicles in the road network of the physical layer PL, a lot of vehicles (objects) may be out of synchronisation. In this case, an object control adapted router in the packet switched control network PSCN optionally waits for a certain time period for the reception of similar time outs from other objects before processing the aggregated event to an external server.

In FIG. 9a and FIG. 9b, Ra and Rb, respectively, can be viewed as the third aspect packet control unit because each of them delete a packet if a corresponding object arrival information is not received within a predetermined time (Ra: deletes the packet such that it is never sent; Rb: deletes the packet after it is been received).

New Object/New Packet Generation

A fifth embodiment of the system in accordance with the invention relates to the treatment of an out of synchronisation state where suddenly an new object occurs on the physical layer P1 which was not present before. This means that the number of packets routed in the packet switch control network PSCN is not the same as the number of vehicles or objects in the physical layer PL and this may cause synchronisation problems.

As shown in FIG. 10, if for example a new object starts at o1 in FIG. 10 on a path section connecting $P_a$ and $P_x$, an object arrival event will be generated from the traffic information unit placed at $P_x$. When $R_x$ receives this information and looks for the presence or arrival of a packet corresponding to the object which has arrived at $P_x$, it will not find such a packet because object o1 is a new object in the physical layer PL.

In such a case, any of the packet control units $R_d$, $R_x$, $R_a$, $R_b$, $R_c$ can serve as a synchronisation packet control unit simply by generating a new packet by a packet generation device GEN and forwarding the packet to $R_x$ such that a packet corresponding to the object which has arrived at $P_x$ is also present in the buffer of $R_x$. For example, one of the packet control units $R_d$ may be a specialized packet generation packet control unit specially dedicated for generating new packets in case of need. $R_x$, after receiving the object arrival information from $P_x$, can perform a broadcasting/multicasting by sending appropriate signalling messages to neighbouring packet control units to first look for the missing packet and if no such packet is found it can request the specially dedicated packet control unit $R_d$ to generate such a packet.

In FIG. 10, any of the packet control units Ra, Rb, Rc, Rd and even Rx can be viewed as a first aspect packet control unit because each of them cause the sending of a (new) packet to the packet control unit whose corresponding path point has detected the arrival of a new object.

Lifetime Field/Number-of-Hops Counter Field Packets

Hereinafter, some further embodiments of the traffic management system explained above are described. For example, one or more of said packets can comprise a lifetime field indicating the lifetime of the packet wherein the packet control units are adapted for deleting a packet if the lifetime field indicates a lifetime exceeding a maximum allowable lifetime. In particular, the packet search request may be constituted by a search packet which is sent to the other packet control units and all packets and in particular the search packet may comprise this lifetime field.

For example, as explained above for FIG. 8 there will not be a search for a packet for an unlimited time if the search packet PFWD comprises a lifetime field.

Furthermore, in accordance with another embodiment of the invention, one or more of the packets, and as explained above in particular the search packet PFWD, can comprise a number-of-hops counter field indicating the number of packet control units through which a packet has been routed, wherein the deletion device DEL of the packet control units are adapted for deleting a packet if said number-of-hops counter field indicates a number of packet control units exceeding a maximum allowable number. Whilst in the aforementioned embodiment of the lifetime field each packet control unit can comprise a check unit to check whether the accumulated lifetime in the lifetime field has exceeded a certain threshold time, in the latter embodiment the packet control units may simply comprise a check unit which checks the number-of-hop counter field which is successively incremented when the search packet or any other packet moves from one packet control unit to the succeeding packet control unit.

If the lifetime field indicates a lifetime exceeding a maximum allowable lifetime, a packet control unit can delete the packet. If the number-of-hops counter field indicates a number of packet control units exceeding a maximum allowable number, likewise a packet control unit can delete a packet.

The use of the lifetime field and number-of-hops counter field is particularly advantageous for the search packet routing. For example, in FIG. 8, the search packet PFWD will have to be routed first to $R_b$ before it can arrive at $R_c$ in order to search for the missing packet. However, it may be rather unlikely that the packet has moved any further than $R_c$ and therefore it is highly unlikely that it is situated outside a region from $R_c$. Therefore, in FIG. 8 it would be useful to set the number-of-hops counter field to 2 such that the search for the missing packet is not continued beyond two packet control units $R_b$ and $R_c$.

The same would apply for using a lifetime field in the search packet PFWD. Also in this situation the search for the missing packet would not be continued indefinitely.

INDUSTRIAL APPLICABILITY

Although the invention was described above with respect to the movement of vehicles in a network constituted by a road network, it should be noted that the traffic management system in accordance with the invention is not limited to this special embodiment. Any kind of traffic on a physical layer PL can be monitored and the objects may be formed by vehicles, persons, cars, bicycles, trains, mail delivery etc. Therefore, it should be understood that the traffic management system of the invention is not limited to the vehicle traffic.

Furthermore, it should be noted that the invention comprises various modifications and variations which fall into the scope of the attached claims. In particular, the invention comprises embodiments which result from a combination of features/steps which have been separately described/shown in the claims/description/drawings.

Furthermore, reference numerals in the claims only serve clarification purposes and do not limit the scope of the invention.

The invention claimed is:

1. A method for managing traffic comprising objects in motion in a network having a physical layer, the method comprising:
   mapping a packet switched control network (PSCN) to topology of the physical layer, wherein packet routing links (PRL) in the PSCN are mapped to path sections in the physical layer;
   associating a packet control unit (PCU) in the PSCN with a corresponding path point in the physical layer;
   utilizing a traffic information unit (TIU), associated with the path point, for detecting and providing traffic arrival and departure information at the path point;
   associating a specific packet in the PSCN with a specific traffic object in the physical layer;
   routing the specific packet along the packet routing links corresponding to the detected movement of the specific traffic object in the physical network;
   determining whether the arrival of the specific traffic object at one of the path points is detected;
   generating an object arrival information if the arrival of the specific traffic object at the one of the path points is detected and sending the specific packet associated with the specific object to the packet control unit corresponding to the one of the path points; and
   directing a synchronization device in a packet control unit to send a packet, corresponding to the specific traffic object, to the packet control unit that corresponds to the path point whose associated traffic information unit has output the specific traffic object arrival information.

2. A packet control unit in a packet switched control network (PSCN), the PSCN comprising a number of packet control units for controlling packet traffic being routed between the number of packet control units via packet routing links, the PSCN being mapped to a network with a physical layer having object traffic such that the packet routing links and the packet control units correspond to path sections and path points, respectively, in the physical layer and each path point is associated with a traffic information unit for detecting arrival of an object at the path point and outputting object arrival information, the packet control unit comprising:
- a transmission device for sending a packet, corresponding to the object on the physical network, to a target packet control unit in the packet switched control network, the target packet control unit corresponding to a specific path point on the physical network;
- a reception device for receiving packets from other packet control units in the packet switched control network and for receiving object arrival information indicating the arrival of at least one object at a path point corresponding to the packet control unit; and
- a synchronization device for sending the packet, corresponding to the object on the physical network, to the packet control unit whose corresponding path point has detected the arrival of the object corresponding to the packet.

3. A packet control unit in a packet switched control network (PSCN), the PSCN comprising a number of packet control units for controlling packet traffic being routed between the number of packet control units via packet routing links, the PSCN being mapped to a network with a physical layer having object traffic such that the packet routing links and the packet control units correspond to path sections and path points, respectively, in the physical layer and each path point is associated with a traffic information unit for detecting arrival of an object at the path point and outputting object arrival information, the packet control unit comprising:
- a transmission device for sending a packet, corresponding to the object on the physical network, to a target packet control unit in the packet switched control network according to a predetermined routing method for controlling the packet traffic, the target packet control unit corresponding to a specific path point on the physical network;
- a reception device for receiving packets from other packet control units in the packet switched control network and for receiving object arrival information indicating the arrival of at least one object at a path point corresponding to the packet control unit and
- a synchronization device for deleting the packet, corresponding to the object on the physical network, if the object arrival information indicating the arrival of the object corresponding to the object on the physical network is not received within a predetermined time interval by the reception device.

4. The packet control unit of claim 3, the synchronization device being adapted to cause said transmission device to send to said packet control unit corresponding to said path point at which the object arrival was detected, a packet stored at said one of said plurality of packet control units and to be transmitted to said target packet control unit.

5. The packet control unit of claim 3 the synchronization device further comprising means for causing the transmission device of the packet control unit corresponding to a path point from which the object has moved to send a packet stored at another packet control unit to the packet control unit corresponding to the path point at which the object arrival was detected.

6. The packet control unit of claim 3, wherein the synchronization device is adapted for causing the transmission device to send a copy of a packet stored at the packet control unit to the target packet control unit where the object arrival was detected.

7. The packet control unit of claim 3, wherein the synchronization device is adapted for storing packet link information indicating the target control unit, the synchronization device being further adapted to cause the target packet control unit, indicated by the packet link information, to send the packet stored to the packet control unit corresponding to the path point at which the object arrival was detected.

8. The packet control unit of claim 3, the synchronization device being adapted to broadcast a packet search request to all adjacent packet control units to cause said target packet control unit to send a packet to the packet control unit corresponding to said path point at which the object arrival was detected.

9. The packet control unit according to claim 3, the synchronization device being adapted to cause a packet generating device to generate a new packet and cause said transmission device to send to said packet control unit corresponding to said path point at which the object arrival was detected said newly generated packet.

10. A traffic management system for managing object traffic in a network, the traffic management system comprising:
- a physical layer, comprising:
  - objects moving along
  - path sections that are connected to each other by path points located at the end of each path section;
  - traffic information units associated with each path point, the traffic information unit adapted for detecting arrival of objects at the respective path point and for sending object arrival information associated with the corresponding path point; and
- a packet switched control network, comprising:
  - packet routing links, corresponding to the path sections on the physical layer, for routing packets corresponding to objects on the physical layer;
  - packet control units, corresponding to the path points on the physical layer, connecting the packet routing links for controlling packet traffic so that each packet corresponds to an object moving on a corresponding path section in the physical layer, the packet control units adapted for sending, as a source packet control unit, packets to a target packet control unit via the packet routing links according to a predetermined packet routing method for controlling the packet traffic in the packet switched control network,
- whereupon a traffic information unit, detecting the arrival of an object at the traffic information unit associated path point, outputs a corresponding object arrival information and a packet control unit corresponding to the associated path point does not detect the arrival of a packet corresponding to the object, a synchronization packet control unit is adapted for sending a packet corresponding to the object to the packet control unit corresponding to the associated path point to synchronize the packet routing and the object movement.

11. The system of claim 10, wherein the traffic information units are also adapted to guide an object onto a path section to a succeeding path point corresponding to a target packet control unit determined by the source packet control unit in accordance with said routing decision.

12. The system of claim 10, wherein a packet search request comprises a search packet being sent to packet control units adjacent packet control units.

13. The system of claim 12, wherein the search packet comprises a life time field indicating the life time of the search packet and the adjacent packet control units comprise a deletion device adapted to delete the search packet if the life time field indicates a life time exceeding a predetermined maximum allowable life time.

14. A method for managing traffic comprising objects in motion in a network having a physical layer, the method comprising:
   mapping a packet switched control network (PSCN) to topology of the physical layer, wherein packet routing links (PRL) in the PSCN are mapped to path sections in the physical layer;
   associating a source packet control unit (PCU) in the PSCN with a corresponding path point in the physical layer;
   utilizing a traffic information unit (TIU), associated with the path point, for detecting and providing traffic arrival information at the path point;
   associating a specific packet in the PSCN with a specific traffic object in the physical layer;
   routing the specific packet along the packet routing links corresponding to the detected movement of the specific traffic object in the physical network;
   determining whether the arrival of the specific traffic object at one of the path points is detected;
   generating an object arrival information if the arrival of the specific traffic object at the one of the path points is detected and sending the specific packet associated with the specific object to a packet control unit corresponding to the one of the path points; and
   directing a synchronization device in one of the packet control units in the PSCN to delete the specific packet if the object arrival information of the specific traffic object at the one of the path points is not received in a predetermined time interval by a reception device in the source packet control unit.

15. The method of claim 14, further comprising directing a transmission device in the packet control unit to send, to said packet control unit corresponding to a path point at which the object arrival was detected, a packet stored at the one of the packet control units to a target packet control unit.

16. The method of claim 15, generating a new packet and sending the generated packet to the packet control unit corresponding to the path point at which the object arrival was detected.

* * * * *

UNITED STATES PATENT AND TRADEMARK OFFICE
CERTIFICATE OF CORRECTION

PATENT NO. : 7,352,743 B2
APPLICATION NO. : 10/644467
DATED : April 1, 2008
INVENTOR(S) : Hameleers et al.

It is certified that error appears in the above-identified patent and that said Letters Patent is hereby corrected as shown below:

In the Drawings:
In Fig. 5b, Sheet 6 of 10, for Tag "PCU", in Box 3, delete "SYCH" and insert -- SYNC --, therefor.

In Column 1, Line 64, delete "Points" and insert -- points --, therefor.

In Column 3, Lines 64-67 - Column 4, Lines 1-32, delete "This object is also solved by...............and the object movement.".

In Column 4, below Line 67 reading "... and the object movement" insert -- This object is also solved by a method for managing in a network the object traffic formed on a physical layer by a plurality of objects moving along a plurality of path sections of the network and a plurality of path points located at said path sections of the network, each path point having associated with it a traffic information unit adapted at least to detect the arrival of objects at the respective path point and to output a corresponding object arrival information, by controlling in a packet switched control network on a traffic control layer the packet traffic constituted by a plurality of packets being routed along a plurality of packet routing links by means of a plurality of packet control units located at said packet routing links; each packet control unit being adapted to send as a source packet control unit respective packets onto a packet routing link to a succeeding target packet control unit on the basis of a respective routing decision in accordance with a predetermined packet routing method used in said packet switched control network for the controlling of said packet traffic; wherein said packet switched control network on the traffic control layer is configured in such a way that packet routing links correspond to path sections; and packet control units correspond to path points; and wherein said controlling of said packet control unit is performed in such a way that each packet routed along a respective packet routing link corresponds to one object moving on a corresponding path section; comprising the following steps: detecting an object arrival at one of said path points and generating a corresponding object arrival information; and causing a packet control unit to send a packet corresponding to said object to the packet control unit corresponding to said path point at which the object arrival was detected. --, therefor.

Signed and Sealed this

Twenty-second Day of June, 2010

David J. Kappos
*Director of the United States Patent and Trademark Office*

CERTIFICATE OF CORRECTION (continued)
U.S. Pat. No. 7,352,743 B2

In Column 6, Line 36, delete "$R_x$" and insert -- Rx --, therefor at each occurrence throughout the patent.

In Column 6, Line 36, delete "$R_a$" and insert -- Ra --, therefor at each occurrence throughout the patent.

In Column 6, Line 36, delete "$R_b$" and insert -- Rb --, therefor at each occurrence throughout the patent.

In Column 6, Line 36, delete "$R_c$" and insert -- Rc --, therefor at each occurrence throughout the patent.

In Column 6, Line 38, delete "$P_x$" and insert -- Px --, therefor at each occurrence throughout the patent.

In Column 6, Line 36, delete "$P_a$" and insert -- Pa --, therefor at each occurrence throughout the patent.

In Column 6, Line 36, delete "$P_b$" and insert -- Pb --, therefor at each occurrence throughout the patent.

In Column 6, Line 36, delete "$P_c$" and insert -- Pc --, therefor at each occurrence throughout the patent.

In Column 6, Line 38, delete "TMYS" and insert -- TMSYS --, therefor.

In Column 6, below Line 49 reading "....and third aspect of the invention;" insert -- Fig. 5b shows a principle block diagram of a packet control unit in accordance with the invention; --.

In Column 8, Line 40, delete "SMYS" and insert -- TMSYS --, therefor.

In Column 9, Line 24, delete "RDn" and insert -- RDN --, therefor.

In Column 9, Line 27, delete "RDW," and insert -- RDN, --, therefor.

In Column 9, Line 54, delete "a-respective" and insert -- a respective --, therefor.

In Column 13, Line 22, delete "p1" and insert -- P1 --, therefor at each occurrence throughout the patent.

In Column 13, Line 23, delete "p2" and insert -- P2 --, therefor at each occurrence throughout the patent.

In Column 16, Line 67, after "sync5" delete "vthe" and insert -- the --, therefor.

In Column 20, Line 3, delete "RX" and insert -- Rx --, therefor.

In Column 21, Line 6, delete "PFCN" and insert -- PSCN --, therefor.

In Column 27, Line 12, delete "$R_d$" and insert -- Rd --, therefor at each occurrence throughout the patent.

In Column 29, Line 53, in Claim 3, after "unit" insert -- ; --.